(12) United States Patent
    Kramer

(10) Patent No.: US 10,687,546 B2
(45) Date of Patent: *Jun. 23, 2020

(54) FRUIT FLAVORING IN THE IMAGE OF A FRUIT PORTION FOR INTRODUCTION INTO A VESSEL FOR FLAVORING A FLUID

(71) Applicant: James F. Kramer, Foster City, CA (US)

(72) Inventor: James F. Kramer, Foster City, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 15/601,998

(22) Filed: May 22, 2017

(65) Prior Publication Data

US 2017/0251702 A1    Sep. 7, 2017

Related U.S. Application Data

(63) Continuation-in-part of application No. 14/333,482, filed on Jul. 16, 2014, now Pat. No. 9,655,380, which
(Continued)

(51) Int. Cl.
*A47J 31/00*    (2006.01)
*B65G 25/08*    (2006.01)
*A23L 2/56*     (2006.01)
*A23L 2/38*     (2006.01)
*B65D 23/14*    (2006.01)
*B65D 51/28*    (2006.01)
(Continued)

(52) U.S. Cl.
CPC .................... *A23L 2/56* (2013.01); *A23L 2/38* (2013.01); *B65D 23/04* (2013.01); *B65D 23/12* (2013.01); *B65D 23/14* (2013.01); *B65D 51/28* (2013.01); *B65D 51/2835* (2013.01); *B65D 85/808* (2013.01); *B65D 2571/00827* (2013.01); *B65D 2571/00851* (2013.01); *B65D 2571/00925* (2013.01)

(58) Field of Classification Search
CPC ... A23L 2/56; A23L 2/38; B65D 2571/00851; B65D 2571/00827; B65D 51/28; B65D 2571/00925; B65D 51/2835; B65D 85/808; B65D 23/04; B65D 23/12; B65D 23/14
USPC ......... 99/323, 295, 279, 317, 319, 321, 322; 239/53, 55, 60, 44, 24; 206/0.5, 219; 222/187; 215/DIG. 8; 426/115, 120
See application file for complete search history.

(56) References Cited

U.S. PATENT DOCUMENTS 2,546,848 A    3/1951 Bishop
2,788,733 A    4/1957 Jacques
(Continued)

*Primary Examiner* — Reginald Alexander

(57) ABSTRACT

An apparatus and method are provided for storing and dispensing into a liquid a soluble substance, such as a flavoring, a body fuel, a nutritional supplement, a stimulant, a relaxant, an alcohol neutralizer, or a medical drug. A useful application of the subject invention includes a lime flavoring held by a gelatinous artificial lime wedge stored with a beer bottle or can, or attached to a 6-pack or 12-pack carton. The artificial lime wedge may be retrieved from a protective covering and acted upon so it mixes the lime flavoring into the beer when it is inserted into the beer bottle or can. Rather than needing to buy and store a perishable natural lime, and cut it up, an artificial lime wedge may be stored for an extended period of time with a beer vessel and placed in functional contact with the beer at time of consumption.

37 Claims, 16 Drawing Sheets

Related U.S. Application Data is a continuation of application No. 12/446,202, filed as application No. PCT/US2007/081704 on Oct. 17, 2007, now Pat. No. 8,783,166, which is a continuation-in-part of application No. 11/549,979, filed on Oct. 17, 2006, now Pat. No. 7,798,056.

(51) Int. Cl.
 *B65D 23/04* (2006.01)
 *B65D 23/12* (2006.01)
 *B65D 85/808* (2006.01)

(56) References Cited

U.S. PATENT DOCUMENTS

| | | |
|---|---|---|
| 3,118,427 A | 1/1964 | Stanzel |
| 3,620,759 A | 11/1971 | Maddox |
| 3,710,795 A | 1/1973 | Higuchi et al. |
| 3,797,646 A * | 3/1974 | Horne ............... B65D 81/3238 206/219 |
| 3,861,284 A | 1/1975 | Costello |
| 3,881,634 A | 5/1975 | Thrun |
| 4,304,869 A | 12/1981 | Dyke |
| 4,339,550 A | 7/1982 | Palinczar et al. |
| 5,246,142 A | 9/1993 | DiPalma |
| 5,288,159 A | 2/1994 | Wirt |
| 5,924,151 A | 7/1999 | Connan |
| 5,984,141 A | 11/1999 | Gibler |
| 6,024,012 A | 2/2000 | Luzenberg, Jr. |
| 6,390,292 B2 | 5/2002 | Hawthorne |
| 6,517,878 B2 | 2/2003 | Heczko |
| 6,541,055 B1 | 4/2003 | Luzenberg, Jr. |
| 6,644,471 B1 | 11/2003 | Anderson |
| 6,844,015 B2 | 1/2005 | Yuguchi |
| 6,854,595 B2 | 2/2005 | Kiser |
| 6,886,686 B2 | 5/2005 | Anderson |
| 6,951,275 B2 | 10/2005 | Galdos |
| 7,051,648 B2 * | 5/2006 | Fenaroli ............... A47G 19/16 426/77 |
| 8,642,051 B2 | 2/2014 | Stillman |
| 8,783,166 B2 * | 7/2014 | Kramer ............... A23L 2/38 99/323 |
| 2001/0042446 A1 | 11/2001 | Denny |
| 2004/0118711 A1 * | 6/2004 | Duffield ............... B65D 65/46 206/219 |
| 2004/0178086 A1 | 9/2004 | Sawaguchi |
| 2007/0175771 A1 * | 8/2007 | Hooser ............... B65D 85/816 206/0.5 |
| 2014/0220181 A1 * | 8/2014 | Stillman ............ A47G 19/2222 426/61 |

* cited by examiner

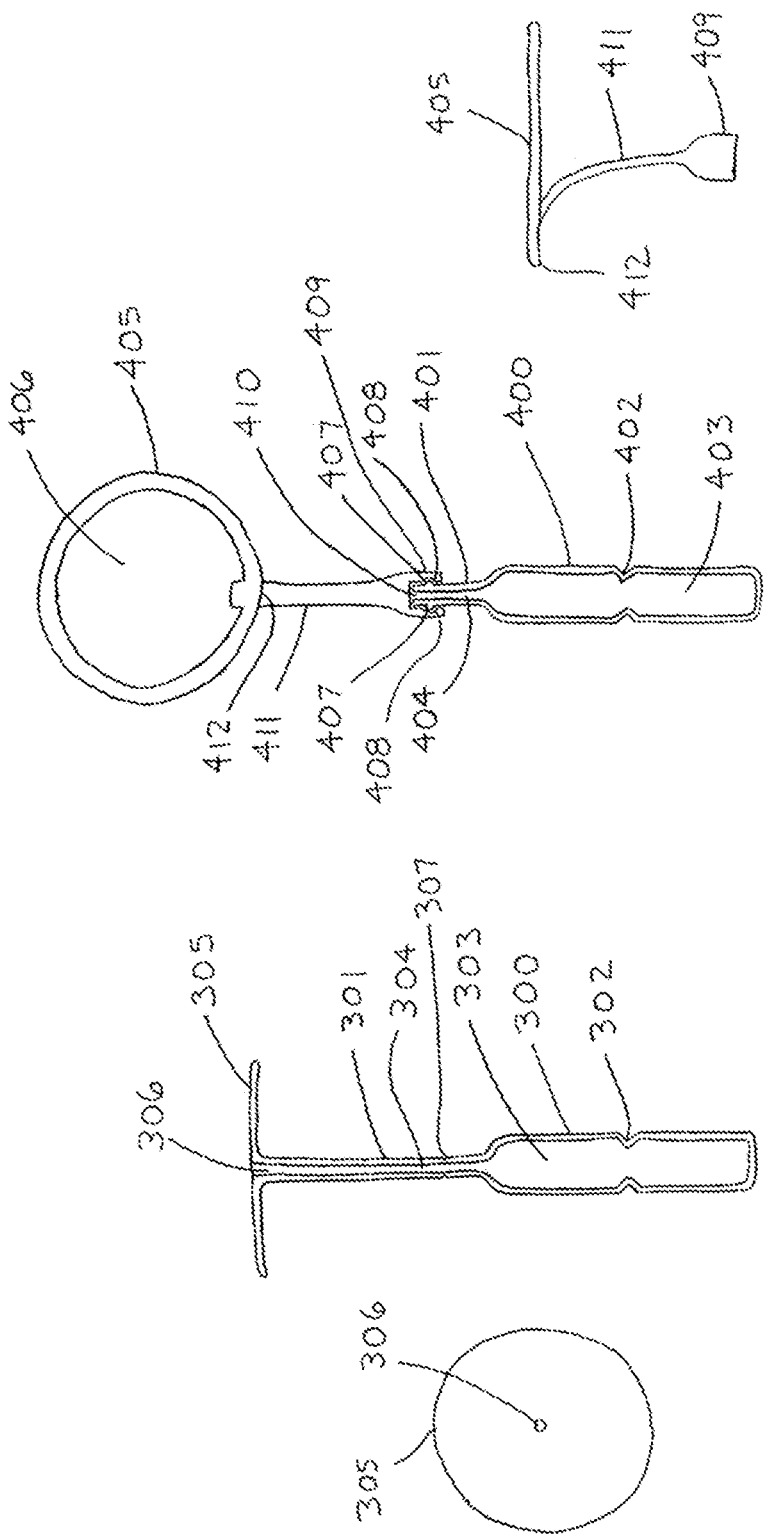

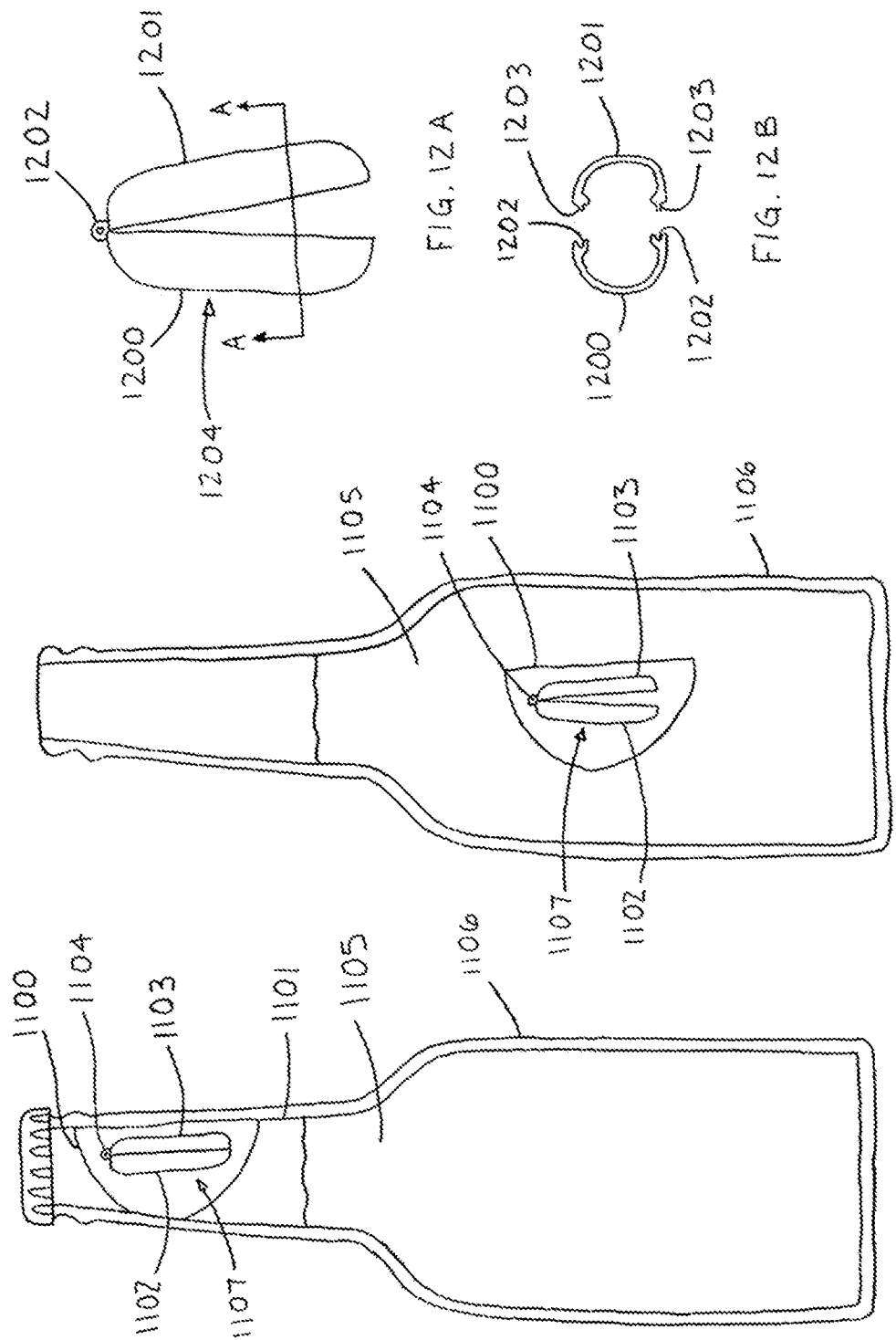

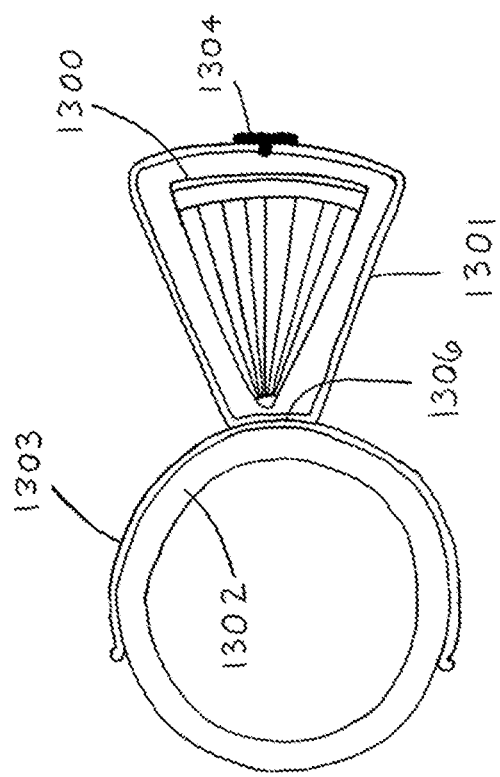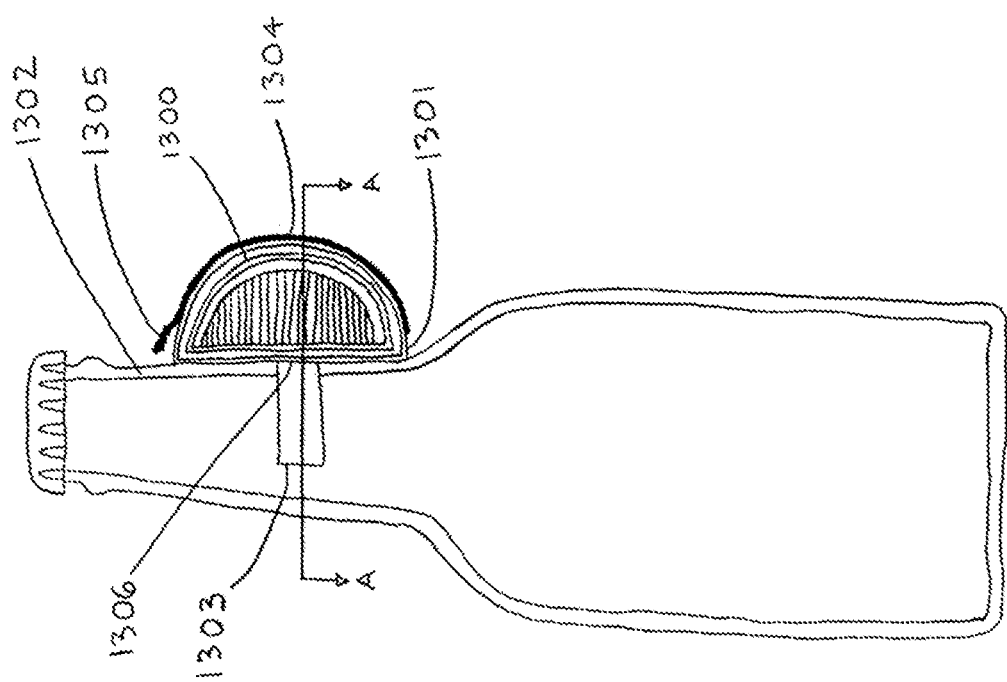
FIG. 13B
FIG. 13A

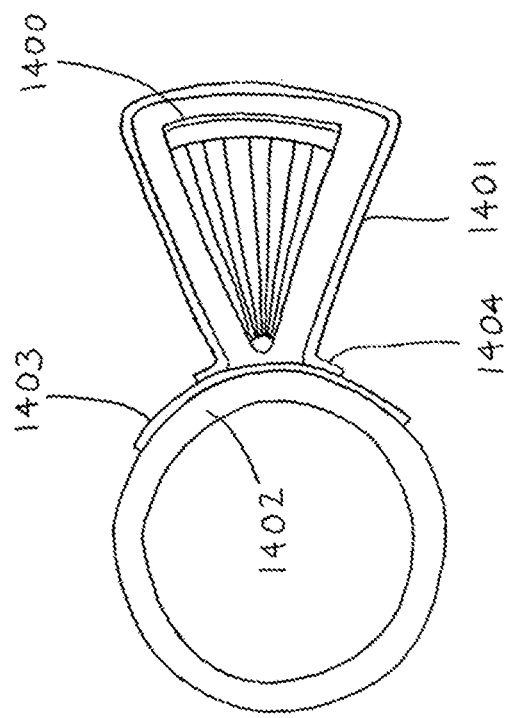
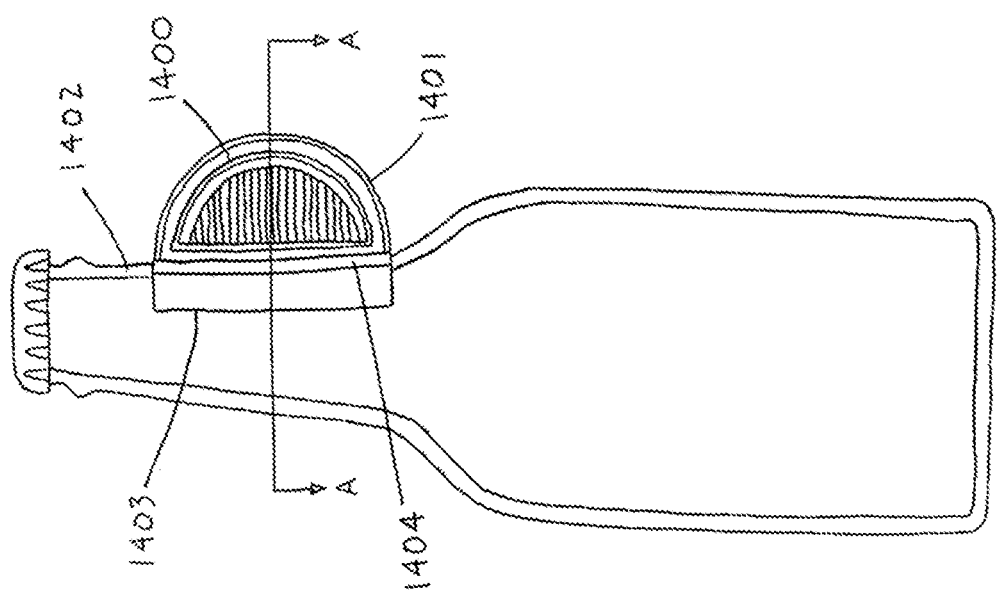

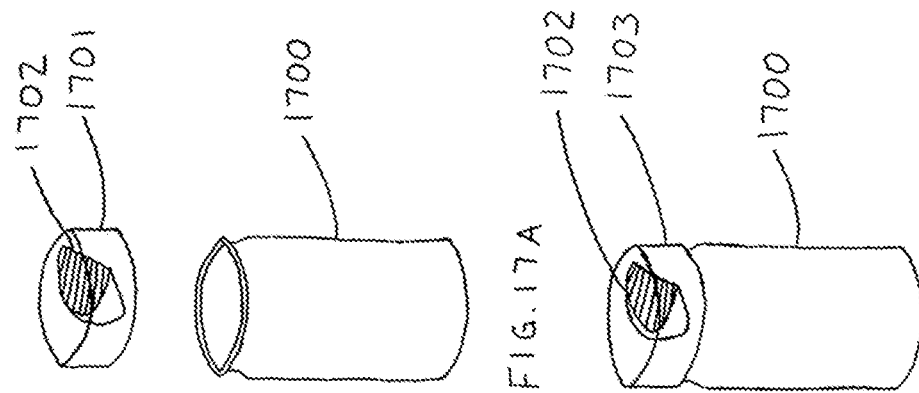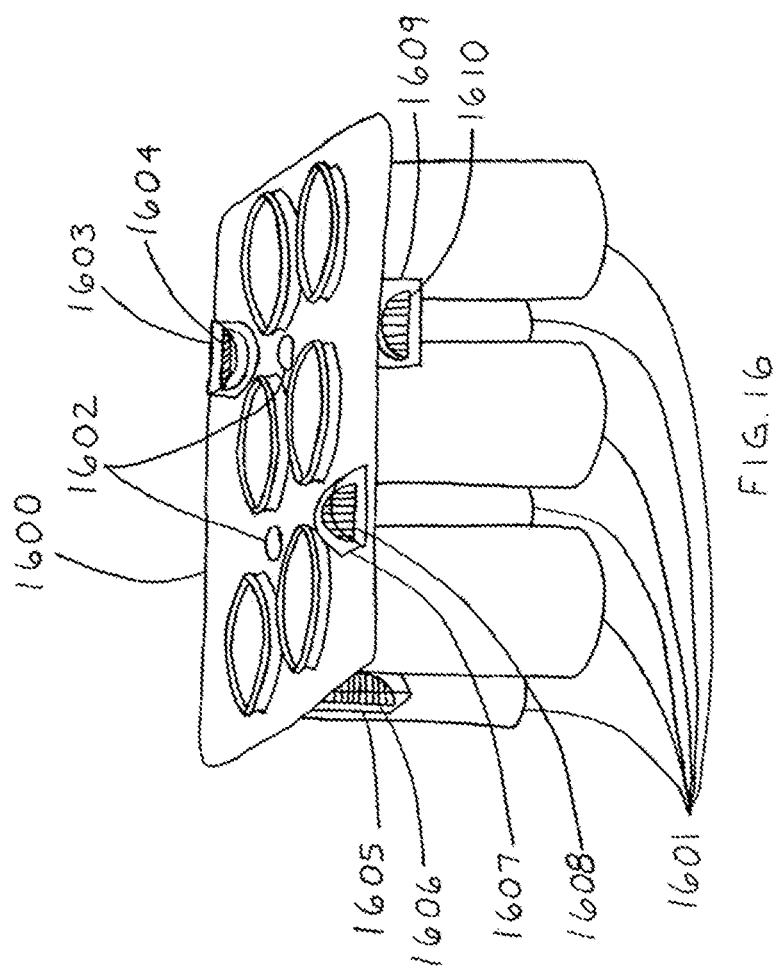

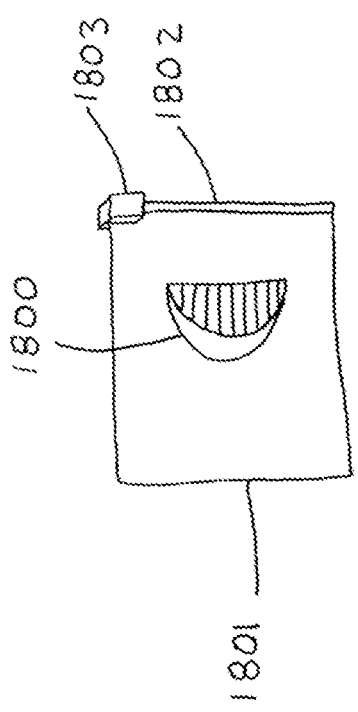
FIG. 18A
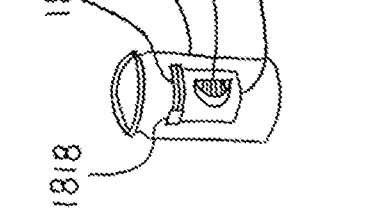
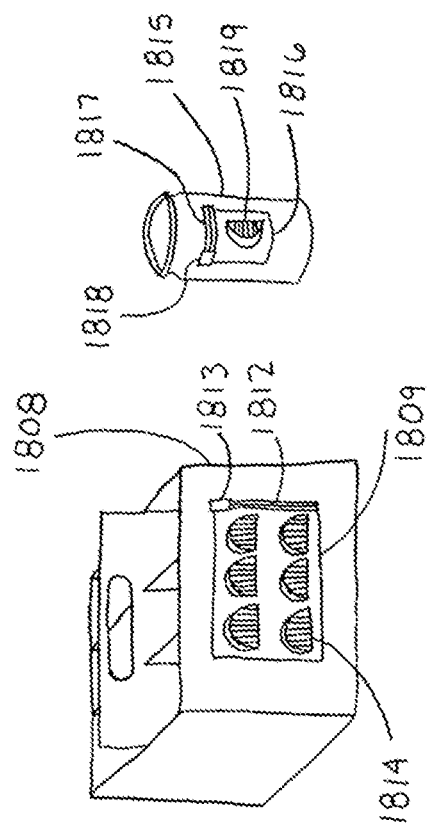
FIG. 18D
FIG. 18C
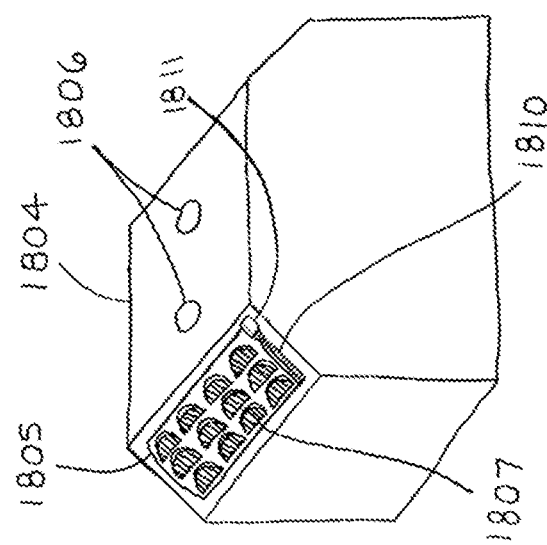
FIG. 18B

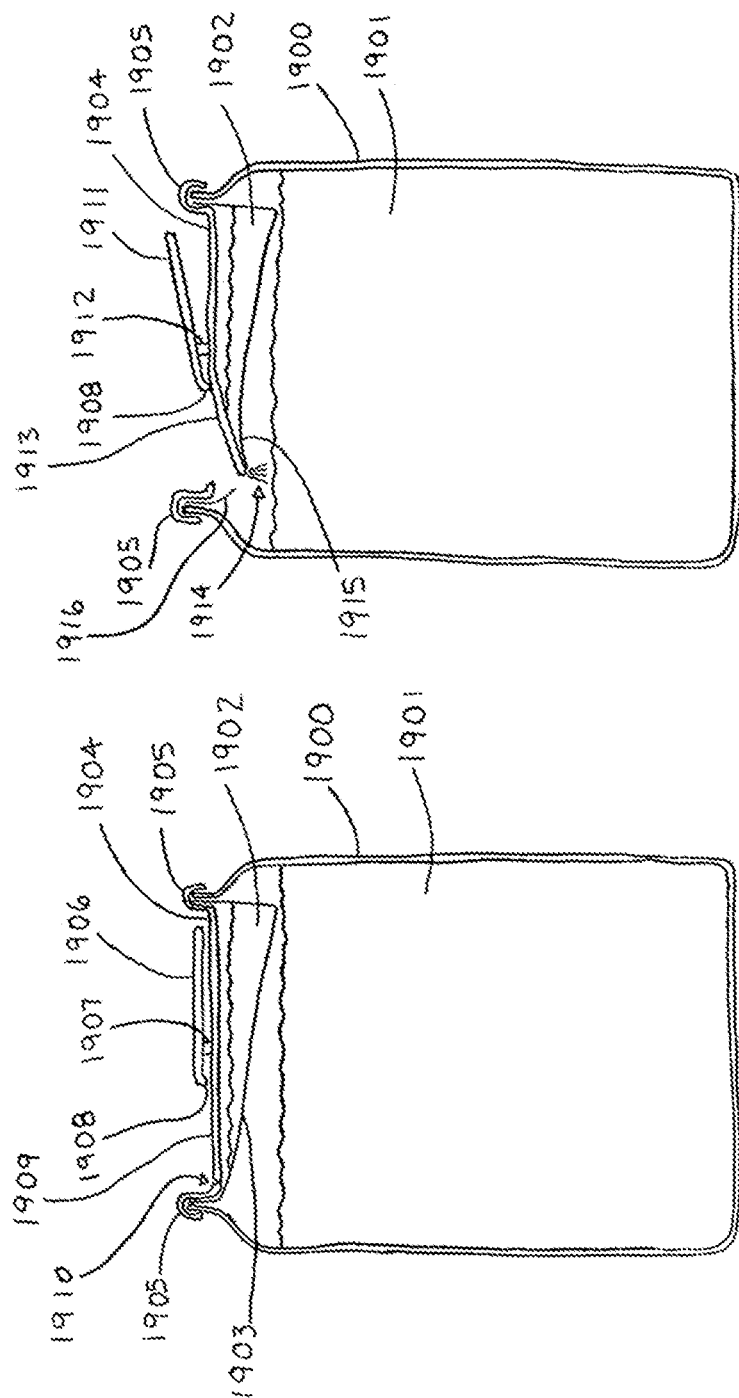

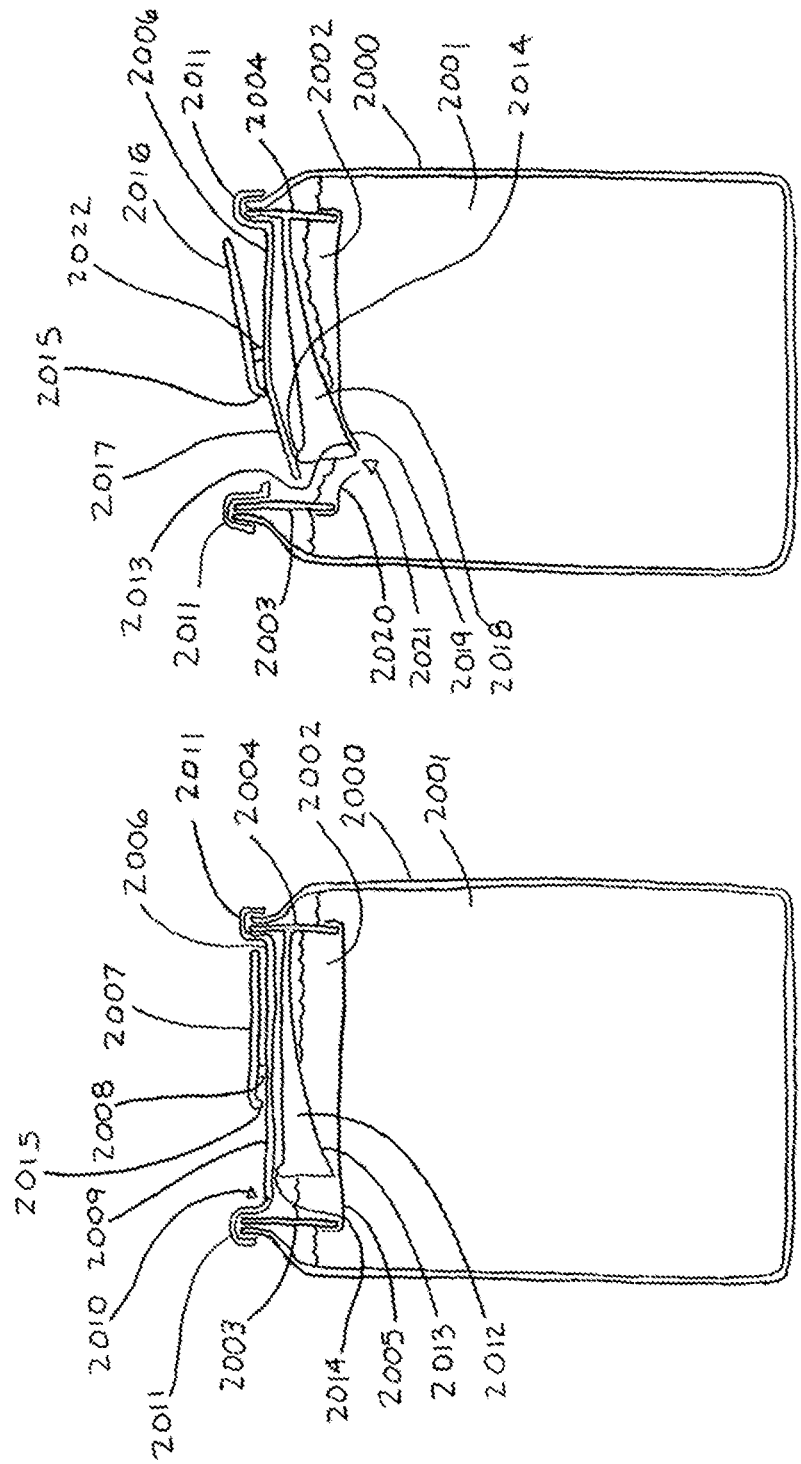

FRUIT FLAVORING IN THE IMAGE OF A FRUIT PORTION FOR INTRODUCTION INTO A VESSEL FOR FLAVORING A FLUID

TECHNICAL FIELD

The field of this invention is devices associated with flavoring a bottled beverage.

BACKGROUND

One often wishes to use another liquid or flavoring with their beverage, where it is undesirable or inconvenient to premix the liquid or flavoring with the beverage. As examples, there is lemon or milk with tea, citrus fruit flavored liquids with beer, juices with alcoholic beverages, alcohol with soft drinks, sugar with coffee or tea, salt with tequila, etc. In many cases, particularly with prepackaged beverages, the purchaser of the prepackaged beverage is not located at a place where the other liquid or flavoring is conveniently accessible.

Many popular beverages are served in a bottle. For example, when certain brands of beer, especially Mexican beers, are served it is common to add a flavoring, such as a wedge or slice of lime. For instance, when a patron at a bar orders a Corona Extra® (www.corona.com), a Pacifico® beer (www.gmodelo.com.nmx/eng/marcas/pacifico.html) or a Dos Equis® beer (www.dosxx.com), the beer is frequently served with a natural lime slice inserted into the neck of the opened bottle. This scenario is adequate when one has easy access to natural limes. However, as is often the case, one buys a bottle of beer in a store or gets one from their refrigerator and does not have a natural lime handy. For such situations it would be convenient to have the lime or an equivalent packaged with the bottle. Since natural limes do not store indefinitely, an alternative is to package an artificial lime containing lime-flavored liquid, optionally from concentrate and optionally with preservatives, with the bottle of beer. Another popular American beer, Widmer Hefeweizen® (www.widmer.com), is often consumed with lemon. In this case, it would be convenient to have an artificial lemon containing lemon-flavored liquid packaged with the beer.

RELEVANT LITERATURE

Luzenberg, Jr., U.S. Pat. No. 6,024,012, describes a porous plastic dispensing article. Luzenberg, U.S. Pat. No. 6,541,055, describes a porous plastic dispensing article. Gibler, U.S. Pat. No. 5,984,141, describes a beverage storage and mixing device. Anderson, U.S. Pat. No. 6,886,686, describes a dispensing capsule for a liquid container. Anderson, U.S. Pat. No. 6,644,471, describes a dispensing capsule for a liquid container. DiPalma, et al., U.S. Pat. No. 5,246,142, describes a device for storing two products separately and subsequently mixing them.

SUMMARY OF THE INVENTION

The subject invention provides a combination of a beverage liquid in a sealed vessel and a flavoring, such as an ancillary liquid or soluble substance, accompanying the vessel in a convenient form for admixing the flavoring with the beverage liquid upon opening the vessel. In a useful embodiment, the flavoring is insoluble and forms a suspension when mixed with the beverage liquid. Typically the flavoring is stored with or in relation to the vessel and used in conjunction with the beverage liquid contained therein.

When the flavoring is an ancillary liquid typically it is stored in a container, that may be frangible or breachable, that is connected to and separable from the support for the container. The support is removably in contact with the vessel. Conveniently, the container is housed in a foam housing, desirably in the image or form of a portion of a fruit, including but not limited to a citrus fruit, including but not limited to a lime or lemon wedge or slice. Using the image (such as the size, shape, texture and color) of a portion of a fruit, a desired organoleptic response is typically generated similar to that generated by a natural portion of a fruit. The housing may also be comprised of rubber, plastic, fabric or other convenient material. The housing may comprise pores, valves, channels, holes, mesh passageways or any convenient means for controlling or regulating the rate whereby the flavoring may escape and mix with the beverage liquid. When the flavoring comprises a soluble substance it may comprise elastic or foam properties. Typically it is pressed through a vessel opening so it makes contact with the beverage liquid and the soluble substance may begin to dissolve. Such a flavoring may be stored in a protective covering that may be transparent or opaque. The protective covering may comprise foil, film, paper, plastic, glass or any convenient sanitizable covering material.

When a fruit portion comprises a soluble material, the fruit portion may be made entirely of soluble material or it may be made from non-soluble foam, rubber, plastic, fabric and the like and contain the soluble material along with pores, valves, holes, mesh passageways, and the like to allow beverage liquid to flow over and/or otherwise mix with the soluble material. The soluble or insoluble fruit portion may be coated with a substance that fizzes, foams, effervesces, and the like, when it comes into contact with a beverage liquid or air. Typically, the fruit portion is stored in a protective covering comprising foil, plastic, fabric, glass, paper, cardboard, and the like, or any other convenient sanitizable, breachable material. The protective covering may be transparent, opaque or translucent. A convenient embodiment comprises a non-soluble foam or mesh fruit wedge, including but not limited to a lime wedge or slice, comprising soluble material, including but not limited to impregnated soluble flavoring beads or granules, and stored in a tearable foil protective covering adhered or attached to a beverage bottle or can. The tearable foil protective covering may comprise a hole through it so it can be hung on the neck of a bottle of beverage liquid. The non-soluble foam or mesh fruit wedge may also form a housing into which one or more soluble flavoring tablets or capsules is inserted. In general, the non-soluble foam or mesh fruit wedge may take the form of any fruit portion. The non-soluble foam or mesh fruit portion may be steam sanitized and injected with soluble gel or powder. The housing may be elastic. The housing may be a sack or pouch. The housing may comprise one or more pockets for inserting flavored soluble tablets, beads or granules. The tearable foil protective covering may comprise a perforation to facilitate breaching. Typically, the tearable foil protective covering is torn open, and the non-soluble foam or mesh fruit wedge containing the one or more soluble tablets is removed from the tearable foil protective covering and dropped into, or otherwise introduced into, a beverage bottle or can. As the consumer consumes the beverage liquid, the beverage liquid passes through the non-soluble foam or mesh fruit wedge and over the one or more soluble tablets, thus dissolving a portion of the one or more soluble tablets and thereby mixing the intended flavoring with the beverage liquid during consumption. The size, surface area and number of tablets may be selected based on their dissolution rate and the amount of flavoring desired.

In general, a flavoring can stored in a tearable foil protective covering, where the tearable foil protective covering comprises a hole through a portion of it through which the neck of a beverage vessel can pass, so the tearable foil protective covering can be placed over and hung on the beverage vessel neck. In general, a protective covering for a flavoring may comprise a loop or loop-like structure for hanging on a beverage vessel neck. When the loop-like structure is a hole in a tearable foil protective covering, the perimeter of the hole is typically sealed such that the flavoring is not exposed to air or moisture. The tearable foil protective covering may be sealed around the flavoring and the perimeter of the hole using heat-activated adhesive. The hole, edges and one or more perforations for breaching the tearable foil protective covering may be die cut.

The tearable foil protective covering may start form a single piece of foil that is folder around the flavoring and then sealed, or it may start from two or more pieces of foil that are sealed around the flavoring. The tearable foil protective covering may start from a single long strip of foil on a roll, then be rolled out, then have flavorings spaced near one side edge the strip, then the other edge of the strip folded over the flavorings, then the two edges of the foil heat sealed together, then this "tube" of foil containing flavorings may be heat sealed between neighboring flavorings to provide flavoring compartments along the foil tube, then a region for a perforation may be fused, then a circular shape may optionally be heat fused near the end of each compartment, then a perforation may be cut on the fused perforation region, then the center portion of the optional heat-fused circular shapes may be die cut out, then the tube of compartments may be die cut to separate the compartments.

A single tearable foil protective covering may include multiple and/or different flavorings, such as a soluble lime portion flavoring in one sealed region and salt flavoring in another sealed region. The protective covering may also comprise a "blister pack" or "bubble pack" where one side of the protective covering is durable clear plastic and the other side is breachable, including tearable and pealable away from the plastic side. The tearable side may comprise any convenient sterilizable material, such as paper, foil, film, and the like.

In general, when the flavoring is a soluble portion, it can be manufactured to be elastic, porous and foam-like, similar to a marshmallow. The flavoring may represent a fruit portion. The flavoring may comprise a structure or substance that causes it to expand when it comes into contact with the beverage liquid. The flavoring may comprise, including being impregnated or coated with, a substance to produce a fizz, produce effervescence, produce a popping or crackling sound, release a gas, including $CO_2$, produce a foaming action, and the like, when the substance comes into contact with the beverage liquid or air. The flavoring may comprise, but is not limited to a tablet, gelatin, powder, capsule, liquid, paste, pellet, crystal or thixotropic substance.

In general, a flavoring may comprise an insoluble porous foam housing that houses a soluble flavoring. The insoluble porous foam housing and/or the soluble flavoring may be hydrophilic. When the housing is compressible and comprises a size and shape that requires it to be compressed to pass in through the neck of a beverage vessel, it will not pass out through the beverage vessel neck while drinking; however, it typically will flow to the neck while the beverage liquid is being consumed until it can't pass further due to its size and shape. At that position, the beverage liquid flows through the pores of the housing during consumption causing forced liquid convection over the soluble flavoring, increasing the dissolution rate. The insoluble porous foam housing may be steam sanitized. The insoluble porous foam housing may be injected with soluble flavoring. An insoluble porous foam housing may comprise (a) a dense foam or non-foam outer region for structure and which corresponds visually to a fruit pealing, and (b) an insoluble less dense foam inner portion, optionally of a different color than the outer region, that contains the soluble flavoring and more readily allows the beverage liquid to pass to dissolve the soluble flavoring.

A useful embodiment comprises a soluble flavoring in the shape of a fruit portion stored in a tearable foil protective covering, where the tearable foil protective covering has a hole though a portion of it through which the neck of a beverage vessel can pass so the tearable foil protective covering can be placed over and hung on the beverage vessel neck. The perimeter of the hole is sealed such that the soluble flavoring is not exposed to air and moisture. The soluble flavoring is manufactured to comprise an elastic, porous and foam-like structure, similar to a marshmallow. The marshmallow-like structure also may be impregnated with a soluble flavoring. The soluble flavoring may comprise, including coated with, a substance to produce effervescence when it comes into contact with the beverage liquid. The soluble flavoring may expand when it comes into contact with the beverage liquid. The tearable foil protective covering is sealed around the soluble flavoring and sealed around the perimeter of the hole using heat-activated adhesive, and then the hole, edges and one or more perforations for breaching are die cut.

An apparatus is employed for storing a soluble substance, usually fruit flavored, and typically citrus flavored, with a beverage vessel containing a liquid and for mixing the soluble substance with the liquid. In one embodiment the apparatus comprises a dispensing unit having a breachable container for containing the soluble substance, usually a condensed fluid, and a foam enclosure enclosing at least a portion of the breachable container, wherein the foam enclosure controls the rate of release of the soluble substance upon breaching of the breachable container. The soluble substance may be non-perishable or contain a preservative. Desirably, the dispensing unit is in the form of a portion of a citrus fruit. Another embodiment has as the dispensing unit an elastic entity in the shape of a portion of a citrus fruit enclosed in a protective covering. The elastic entity includes the soluble substance for introduction and dissolution into the liquid. The dispensing unit may be inside or outside the beverage vessel. In a useful embodiment the dispensing unit includes a connector for connecting to the beverage vessel, beverage vessel cap or beverage vessel carrier or holder, or uses pressure for holding the dispensing unit in place in the beverage vessel.

Commonly, the vessel will be a bottle having a narrow neck. Since the bottle will be paradigmatic of the vessel employed in this invention, unless otherwise indicated, whenever using the term "bottle" it is intended to exemplify vessels generally, except when the term bottle is used in the claims. In a common embodiment, the liquid in the vessel will be directly imbibed from the vessel.

The subject invention provides systems for packaging a flavoring in a convenient manner to accompany a bottled beverage, where it is desirable to mix the flavoring with a sealed bottled beverage after the bottle is opened. When the flavoring is an ancillary liquid stored in a container, the container may be supported in an upper portion of the bottle, so as to be readily accessible either before or after the bottle is opened. The container may be attached to an attachment member that serves to attach the container to the bottle.

In one embodiment, using beer or other appropriate beverage as exemplary, an artificial lime wedge or lime slice is suspended in the neck of a beverage bottle above or partially or wholly immersed in the liquid contents. The liquid contents may be beer, and typically a Mexican beer. The artificial lime wedge is typically accessible from an upper portion of the bottle by an attachment member attached to the artificial lime. The attachment member may be connected to the cap of the bottle or the neck of the bottle. One end of the artificial lime attachment member may comprise a cap attachment which may be held between the bottle cap and top of the bottle, such that it is resting on the top of the bottle when the cap is removed. The artificial lime attachment member may also be positioned in the neck of the bottle so it can be reached when the bottle cap is removed. On the end opposite of the artificial lime, the attachment member may have a cap attachment comprising a loop to make it easy to retrieve the artificial lime from the bottle using a single finger. The artificial lime may also be packaged outside the bottle, typically removably attached to the bottle cap, side of the bottle, or bottle carrier or holder.

In another embodiment, the liquid is tea and the artificial lime wedge is replaced by an artificial lemon wedge containing lemon juice or lemon flavoring. In general, the artificial lime wedge may be replaced by a portion of any artificial fruit, including but not limited to citrus fruit, or portion thereof and contain any liquid or flavoring. The artificial lime wedge may also be replaced by any artificial semblance or natural food or portion thereof and contain any liquid, including alcohol or flavoring. The artificial lime wedge may also be replaced by a real lime, lemon or other food that is packaged in a removable container or covering. The natural lime, lemon, fruit or other food may be "dehydrated" or "dried," e.g., freeze-dried. The artificial or natural lime may be coated or impregnated with artificial or natural lime flavoring. In general, the artificial or natural lime may be any artificial or natural fruit portion. It may be non-perishable or optionally contain a preservative. It may be optionally supplemented with a container of flavored liquid. It may optionally contain fruit juice from concentrate. Examples of removable coverings include a plastic container; vacuum-sealed plastic, which may optionally include a tear cord; a Ziploc® plastic bag; and the like. The liquid contents of the bottle may be beer, a soft drink, tea, coffee, milk, water, a sports drink, fruit juice, an alcoholic beverage and the like. A natural lime may also be packaged outside the bottle, typically removably attached to the bottle cap, side of the bottle or bottle carrier. Other typical liquid contents and flavoring pairings include Guinness® beer with chocolate flavoring, European beers with soft drink flavorings, sparkling wine with strawberry flavoring, tequila with salt and tea with sugar. Other fruit flavorings include but aren't limited to orange and kiwi.

A useful embodiment of the subject invention includes an apparatus used in conjunction with a beverage vessel containing a liquid with which a soluble substance is mixed, where the beverage vessel has a narrow opening for drinking the liquid. Typically, the narrow opening is the opening at the top of a glass beer or soda bottle, the opening at the top of a beer or soda can, or the opening at the top of a plastic water bottle. Typically, the apparatus includes a gelatinous elastic entity that may be the semblance of a fruit portion, where the elastic entity includes the soluble substance for introduction and dissolution into the liquid. Typically the elastic entity is larger than the narrow opening and not for fitting uncompressed through a 0.7-inch diameter circular narrow opening, such as the opening in the top of a glass drink bottle, and for passing completely through the narrow opening when compressed, and for uncompressing and remaining unsecured inside the liquid past the narrow opening. In a useful variant, the elastic entity is larger than the narrow opening and not for fitting uncompressed through a 0.4-inch by 0.95-inch oblong narrow opening, such as the opening in the top of an aluminum drink can. In another useful variant, the elastic entity is larger than the narrow opening and not for fitting uncompressed through a 0.39-inch by 0.65-inch oblong narrow opening, such as the opening in the top of a small aluminum drink can. Typically, the elastic entity is not for dissolving during consumption.

In a useful variant of the useful embodiment just described, the elastic entity may include, including being impregnated or coated with, a soluble substance to produce a fizz, produce effervescence, produce a popping or crackling sound, release a gas, including $CO_2$, produce a bubbling or foaming action, and the like, when the soluble substance comes into contact with the beverage liquid or air. The elastic entity may include a structure or soluble substance that causes it to expand when it comes into contact with the beverage liquid.

A useful chemical reaction for releasing $CO_2$ is to add citric acid to baking soda (sodium bicarbonate) in the presence of water. The chemical reaction equation is $3NaHCO_3$ (sodium bicarbonate)$+C_6H_8O_7$ (citric acid)$->Na_3C_6H_5O_7$ (tri-sodium citrate)$+3H_2O$ (water)$+3CO_2$ (carbon dioxide gas). Another useful chemical reaction for releasing $CO_2$ is to add citric acid to calcium carbonate in the presence of water. The chemical reaction equation is $3CaCO_3$ (calcium carbonate)$+2(C_6H_8O_7)$ (citric acid)$->Ca_3(C_6H_5O_7)_2$ (tri-calcium citrate)$+3H_2O$ (water)$+3CO_2$ (carbon dioxide gas). Therefore, adding either baking soda or calcium carbonate to a citrus flavoring containing citric acid, when in a beverage containing water, such as beer, a soft drink, a sports drink, or bottled water, will produce effervescing that gives off carbon dioxide.

When the soluble substance expands or releases a gas, the expansion or release of gas may be used to propel or otherwise move the elastic entity in the liquid. When the soluble substance releases a gas, the release may cause the elastic entity to propel, translate, rotate, articulate, change shape, transform, and the like. The release may generate propulsion using fluid dynamic principles, including transfer of momentum. When the soluble substance expands or releases a gas, the buoyancy of the elastic entity may change, thus changing whether the elastic entity floats or sinks, or the elevation of the elastic entity in the liquid. A released gas may be colored, or change colors as it comes into contact with the liquid or air.

An expanding gas, bubbles, or foam may exit a portion of the elastic entity to cause movement or structural change. Such an elastic entity may be in the image of, or otherwise shaped like, all or a portion of a flying vehicle, a water vehicle, a road vehicle, a mechanical structure, or a creature. An example of a flying vehicle or portion includes, but is not limited to, an airplane, a jet, a rocket, an alien spacecraft, a propeller, and the like, where expanding gas, bubbles, foam, and the like may exit an elastic entity shaped like a flying vehicle causing it to appear to fly in the liquid. An example of a water vehicle or portion includes, but is not limited to, a boat, a submarine, a jet ski, a surfboard, and the like, where expanding gas, bubbles, foam, and the like may exit an elastic entity shaped like a water vehicle causing it to appear to cruise around in the liquid. An example of a road vehicle or portion includes, but is not limited to, a car, a truck, a racecar, a skateboard, and the like, where expanding gas, bubbles, foam, and the like may exit an elastic entity shaped like a road vehicle causing it to appear to drive in the liquid. An example of a mechanical structure or portion includes, but is not limited to, a robot, an articulated structure, a rotating structure, a windmill, a fan, a waterwheel, and the like, where expanding gas, bubbles, foam, and the like may exit an elastic entity shaped like a mechanical structure causing it to appear to move, including in an articulated manner, in the liquid. An example of a creature or portion includes, but is not limited to, a man, a woman, a child, a superhero, a villain, Superman, a bird, a dinosaur, a mythical monster, a ghost, a Transformer toy, and the like, where expanding gas, bubbles, foam, and the like may exit an elastic entity shaped like a creature causing it to appear to walk, move arms, fly in the liquid, and the like.

The elastic entity typically won't fit uncompressed through the narrow opening in the beverage vessel. Accordingly, when the elastic entity is an airplane with a wingspan wider than the width of the narrow opening, the wings would need to be flexed, bent, or otherwise compressed in order to fit the elastic airplane through the narrow opening of the beverage vessel. When the elastic entity is a rocket with fins wider than the width of the narrow opening, the fins would need to be flexed, bent, or otherwise compressed in order to fit the elastic rocket through the narrow opening of the beverage vessel. When the elastic entity is a creature with arms wider than the width of the narrow opening, the arms would need to be flexed, bent, or otherwise compressed in order to fit the elastic creature through the narrow opening of the beverage vessel.

In another useful variant of the useful embodiment, the apparatus may include a cavity for holding a soluble substance, where the elastic entity includes all or a portion of the cavity for controlling the rate of mixing of the soluble substance with the liquid in the beverage vessel. The cavity may include a tube made of licorice, an edible-film container, a reverse-spherification container, a wax container, and the like, for holding the soluble substance. The elastic entity may have holes, channels, slots, slits, grooves, and the like, that may be molded or cut, into the elastic entity for holding a soluble substance so it may quickly contact the liquid, and typically quickly dissolve or mix with the liquid, when the elastic entity is introduced into the beverage vessel. Portions of an elastic entity may be adhered together using gelatin.

When the soluble substance includes citric acid, such as when the elastic entity is shaped like a lime, lemon, or orange wedge or slice, it may be preferred that the citric acid be added to liquid in a plastic or aluminum beverage vessel a short time before drinking; otherwise, the citric acid can cause a plastic vessel to leach into the liquid, and the citric acid can chemically react with an aluminum vessel.

The elastic entity may take on, or otherwise be in, the image of any portion of any fruit. Typical and convenient elastic entity fruit portions for use to flavor beverages include slices, wedges, chunks, spheres, cubes, and the like. When the soluble substance includes citric acid, the elastic entity typically may be a lime wedge or slice, or a lemon wedge or slice, or an orange wedge or slice. When the elastic entity is for taking on the image of a portion of a fruit that is substantially round, such as a lime, lemon, or orange, the elastic entity is typically a spherical wedge. When the elastic entity is for taking on the image of a portion of a fruit that is substantially elongated or cylindrical, such as a banana or cucumber, the elastic entity is typically a cylindrical wedge. For manufacturing convenience, an elastic entity for taking on the image of a portion of a fruit that is substantially round, may also be manufactured as a cylindrical wedge, since it is convenient to cut slices from a long roll of gelatinous elastic material to provide the elastic entity similar to the image of a lime, lemon, or orange wedge.

When the apparatus includes a manufactured fruit portion in the image of a natural fruit, the apparatus may include an outer layer, an optional intermediate layer, and an inner region, where each layer and region may have similarities to the corresponding portions of a natural fruit. In the case where the fruit portion is in the image of a natural lime, the fruit portion may be a gelatinous elastic lime wedge or slice, where the outer layer is gelatinous and dark green. The optional intermediate layer may also be gelatinous but typically a lighter shade of green, or even a yellow color. The inner layer may also be gelatinous but typically a lighter shade of green than the outer layer, but a darker shade of green than the intermediate layer, and may include a porous foam-like gelatinous structure similar to a marshmallow. Typically, making a marshmallow includes whipping, beating, vigorously stirring, or explicitly injecting air into a warm gelatinous and sugar batter to trap air in the batter and create a porous or foam-like structure. Such a porous foam-like structure is good for holding a soluble substance, and in particular, for holding a crystallized lime flavoring, crystal, powder, tablet, bead, granule, pellet, capsule, liquid, paste, gelatin, thixotropic soluble substance, and the like. Typically only the soluble substance is for dissolving in the liquid during consumption; whereas, the layers and regions typically are not for substantially dissolving while the liquid is being consumed, and they may have molded or cut textures similar to the corresponding portions of a natural lime. While the example above relates to a case where the manufactured fruit portion is in the image of a natural lime, the same description also applies to other cases, such as where the manufactured fruit portion is in the image of a natural lemon, orange, kiwi, tangerine, watermelon, and the like, where colors, textures, structures, and the like may be altered so the manufactured fruit portions have similarities to the corresponding portions of the desired natural fruit.

The soluble substance may include flavoring such as citrus flavoring like lime, lemon, orange, and the like. The soluble substance may include other fruit flavoring like grape, strawberry, blueberry, cherry, and the like. In general, soluble substance flavorings may be sweet, sour, bitter, salty, or savory. Such flavorings may include natural flavoring agents like fruit, nut, seafood, spice blends, vegetables, and wine, or chemical flavors that imitate natural flavors. The soluble substance may include fuel for the body, such as carbohydrates, fats, protein, calories, and sugars. The soluble substance may include nutritional supplements, such as vitamins, electrolytes, minerals, weight-loss supplements, dietary supplements, body-building supplements, and protein. The soluble substance may include stimulants such as caffeine, coffee, tea, Red Bull®, Monster®, and other energy drink contents. The soluble substance may include relaxants such as liquid or powdered alcohol, or Tetrahydrocannabinol (THC). The soluble substance may include an alcohol neutralizer, or a medical drug. A useful embodiment includes a gelatinous elastic entity in the shape of a lime wedge or slice with soluble substances that includes one or more of powdered alcohol, such as powdered tequila, crystallized lime flavoring, an electrolyte, salt, and the like.

Drinking water with electrolytes helps to reduce the effects of dehydration and alcohol hangovers often associated with reduced levels of electrolytes. Lemon, lime, tangerine, grapefruit, and orange juice have necessary minerals for electrolyte replenishment. An elastic entity of the subject invention in the shape of a lime wedge, lime slice, or other fruit portion that includes a soluble substance including one or more of citric acid flavoring, electrolytes, caffeine, salt, sugar, and the like, may reduce drowsiness and symptoms of a hangover associated with drinking alcohol.

Elements such as elastic entities, soluble substances, fruits, flavorings, structures, and the like, described for a particular embodiment, variant, or apparatus throughout this application, are described relative to an embodiment for exemplary purposes only, and such elements may be interchanged and combined as convenient to provide myriad other useful embodiments all contemplated by the subject invention.

BRIEF DESCRIPTION OF THE DRAWINGS

FIG. 3A is a cross section of a container, an attachment member and disk-shaped cap attachment, where the container may be filled through a small opening in the disk-shaped cap attachment. FIG. 3B is a top view of the disk-shaped cap attachment.

FIG. 4A is a cross section of a container, a separable attachment member and a loop-shaped cap attachment. FIG. 4B is a side view of the loop-shaped cap attachment and a portion of the attachment member.

In FIG. 8A two pieces of the mold are separated, and in FIG. 8B two pieces of the mold are pressed together.

FIG. 9 is a cross section of the top portion of a beverage vessel comprising a fruit portion, including but not limited to a lime wedge, that is suspended in the beverage vessel by a suspending member attached to a support member, including but not limited to a piece of foam, cork, rubber, plastic and the like.

FIG. 11A is a cross section of a beverage vessel comprising a beverage and an artificial fruit portion, including but not limited to an artificial lime. Inside the artificial fruit portion is a liquid container that releases its liquid contents, including but not limited to fruit-flavored liquid, into the beverage when the artificial fruit portion is lowered into the beverage, as shown in FIG. 11B.

FIG. 12A is a side view of one embodiment of the liquid container of FIGS. 11A and 11B. FIG. 12B is a cross section of the liquid container of FIG. 12A taken at section A-A of FIG. 12A.

FIG. 13A is a front view of a bottled beverage with a fruit portion, including but not limited to a lime wedge, packaged in a removable protective covering and suspended outside the bottle by an external fastener. FIG. 13B is a cross section plan view of the embodiment taken through section A-A in FIG. 13A.

FIG. 14A is a front view of a bottled beverage with a fruit portion, including but not limited to a lime wedge, packaged in a removable protective covering and suspended outside the bottle by an external fastener. FIG. 14B is a cross section of the embodiment taken through section A-A in FIG. 14A.

FIG. 16 is a perspective view of an apparatus for holding one or more fruit portions in convenient proximity to one or more beverage vessels, including but not limited to cans.

FIG. 17A is a perspective view of a fruit portion in a protective covering not in contact with a beverage vessel. FIG. 17B is a perspective view of a fruit portion in a protective covering secured to a beverage vessel.

FIG. 18A is a perspective view of a fruit portion inside a protective covering. FIG. 18B is a perspective view of one or more fruit portions inside a protective covering and secured to a first embodiment of a beverage vessel carrier. FIG. 18C is a perspective view of one or more fruit portions inside a protective covering and secured to a second embodiment of a beverage vessel carrier. FIG. 18D is a perspective view of one or more fruit portions inside a protective covering and secured to a beverage vessel.

FIG. 19A is a cross section of a beverage vessel in an unactivated configuration where a first fluid is separated from a second fluid. FIG. 19B is a cross section of the beverage vessel in an activated configuration for mixing the first fluid with the second fluid.

FIG. 20A is a cross section of a beverage vessel in an unactivated configuration where a first fluid is separated from a second fluid. FIG. 20B is a cross section of the beverage vessel in an activated configuration for mixing the first fluid with the second fluid.

DETAILED DESCRIPTION OF THE INVENTION

Figure 2:
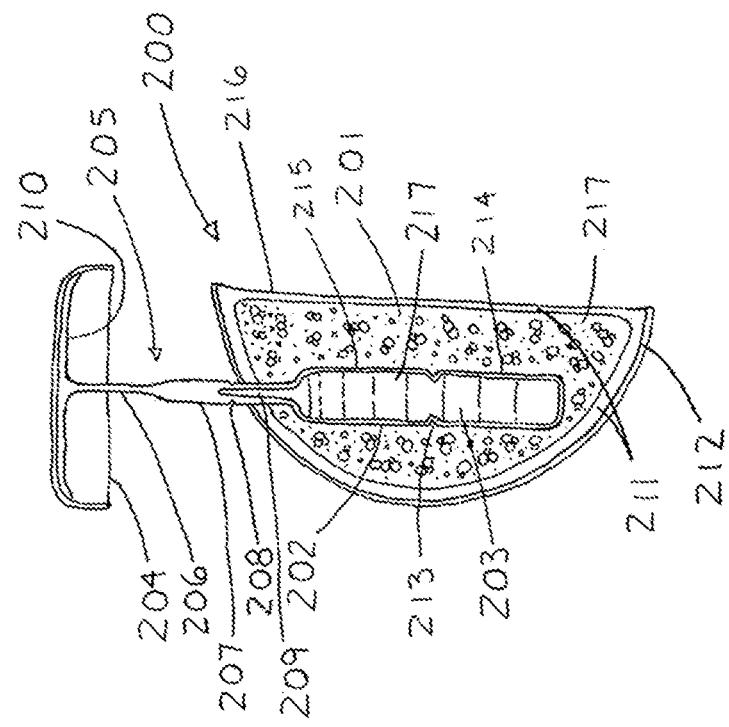
FIG. 2 is a cross section of an assembly comprising an artificial fruit portion attached to a bottle cap by an attachment member, where the artificial fruit portion is a wedge and comprises an elastic foam body and a container containing fruit-flavored liquid.

The subject invention is further described in detail hereunder referring to the embodiments provided in the drawings.

Figure 1:
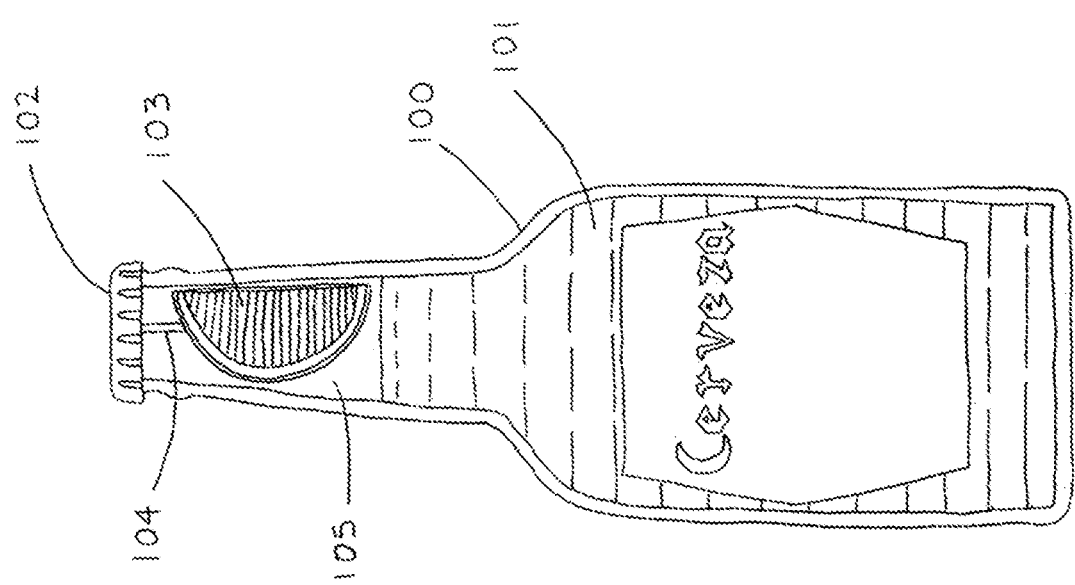
FIG. 1 is a front view of a bottled beverage with a fruit portion suspended inside the neck of the bottle from the bottle cap. The fruit portion may include an artificial citrus portion, including but not limited to an artificial lime wedge or slice containing lime-flavored liquid or other flavored soluble substance including but not limited to a lime-flavored soluble substance. The fruit portion may include a natural citrus portion, including but not limited to a natural lime wedge or slice, which may be dehydrated or otherwise preserved.

FIG. 1 is a beverage bottle 100 containing a beverage 101, including but not limited to beer, with a fruit portion 103, including but not limited to a lime portion, attached to and suspended from the cap 102 of the bottle 100 by an attachment member 104. The fruit portion 103 is typically only a portion of a fruit, including but not limited to a triangular lime wedge or slice. When the cap 102 is on the beverage bottle 100 and the bottle 100 is sitting upright on a horizontal surface, the fruit portion 103 is typically suspended in the space 105 above the beverage 101. When the cap 102 is removed from the bottle 100 the fruit portion 103 may also be removed because it may be attached to the cap 102 by the attachment member 104. When the fruit portion 103 is removed from the bottle 100 it may be discarded or used as further described in FIG. 2.

The attachment member 104 may comprise a rod or tube and may be flexible or rigid, or may comprise combinations thereof. The attachment member 104 generally has a maximum diameter of about 0.25 inches, where the minimum diameter is typically chosen to provide the required strength. Generally, the vertical portion of the attachment member 104 when in the bottle 100 will be not more than about 2 inches and may be as short as 0.1 inches. Portions of the attachment member 104 may be of different dimensions and characteristics, typically where an upper portion of the attachment member 104 (near the cap) is flexible and a lower portion (adjacent to the fruit portion 103) is more rigid. The attachment member 104 may have a concavity or protuberance for connecting to an artificial fruit liquid container, may serve as a stopper in the artificial fruit liquid container, or may possess another means of attachment to the artificial fruit liquid container. The portion of the attachment member 104 distal from the fruit portion 103 is joined to means for retaining the fruit portion 103 in the upper portion of the bottle 100. The attachment member 104 may be flexibly attached to the cap 102 or attached to a circular disc that fits into the cap 102 and extends over the bottle top. In the latter case, the attachment member 104 may be flexible or rigid at the end distal from the fruit portion 103.

FIG. 2 is a cross section of an assembly 200 comprising a portion of an artificial fruit 216 (including but not limited to an artificial lime or lemon), a container 202, an attachment member 205 and a bottle cap 204. The attachment member 205 is comprised of a connecting link 206 that connects the bottle top covering member 210 and the container connector 207, where the container connector 207 is in turn attached to the container 202. The assembly 200 comprises a foam body 201 enclosing all or a portion of the container 202. The artificial fruit 216 typically represents only a portion of the artificial fruit, including but not limited to a triangular lime wedge or lemon slice. In this example, the container liquid 203 in the container 202 may be real fruit juice (including but not limited to real lime juice), artificial fruit juice (including but not limited to artificial lime juice), fruit flavored liquid (including but not limited to lime flavored liquid) or another desired liquid. The container 202 is attached to the bottle cap 204 by the attachment member 205. The attachment member 205 typically comprises a connecting link 206 that is conveniently flexible and at one end has a bottle top covering member 210 in contact with the bottle cap 204. The bottle top covering member 210 may be permanently attached to the bottle cap 204, typically by adhesive or molding, or separable from the bottle cap 204. When the connecting link 206 is flexible, the container connector 207 is typically more rigid. The container connector 207 may comprise a score 208 to allow the container 202 to be easily separated from the attachment member 205 by snapping it off.

The attachment member 205 may be molded to provide the desired shape and treated to provide the desired physical properties. Various plastic materials can be used to be shaped into the various forms comprising the attachment member 205, treating portions differently to be rigid or flexible, as required.

In one embodiment, the container cavity 217 containing the container liquid 203 extends beyond the score 208 of the container connector 207 of the attachment member 205 by means of channel 209. Accordingly, when the container 202 is separated from the attachment member 205, container liquid 203 can escape from the container 202 through the channel 209. Typically, the container liquid 203 escapes from the container 202 by pouring or squeezing the container 202. For example, after the bottle cap 204 (and 102 in FIG. 1) is removed from a bottle (including but not limited to the bottle 100 in FIG. 1), the bottle cap 204 is separated from the artificial fruit 216 by snapping at the score 208, and fruit juice can be poured or squeezed into the beverage (including but not limited to the beverage 101 in FIG. 1) from the container 202 inside the artificial fruit 216.

The container 202 can be further made to release the container liquid 203, typically by snapping the container 202, or otherwise breaching, breaking, crushing, puncturing, unscrewing, pulling apart and the like. In FIG. 2, the container 202 comprises a score 213 to facilitate separating the container 202 by snapping it into two pieces: a bottom container piece 214 and a top container piece 215. When the container 202 is separated, the container liquid 203 is released and enters the surrounding foam body 201. If desired, the artificial fruit 216 can then be re-inserted into the bottle (including but not limited to bottle 100 in FIG. 1) and dropped into the beverage (including but not limited to the beverage 101 in FIG. 1). The foam body 201 of the artificial fruit 216 regulates the rate at which the released container liquid 203 is allowed to mix with the beverage (101). The density and type of pores in the foam body 201 are selected to obtain a desired mixing rate. Different densities and types of foam may be selected according to the container liquid 203. For instance, a container liquid 203 with high surface tension may use a foam body 201 with less dense foam or foam with larger pores.

To enhance the realism of the artificial fruit 216, the foam body 201 is typically textured and colored to resemble a real fruit. In addition to visual properties, the foam body 201 can also be selected to approximate the mechanical properties of a real fruit, including its compliance and damping. For instance, for the case where the artificial fruit 216 is an artificial lime, the circular perimeter 212 is typically a dark lime green color and denser than the rest of the artificial fruit 216; the middle layer 211 is typically a light yellow color; and the inner portion 217 is typically textured like the pulp of a real lime and is a darker yellow color than the light yellow color of the middle layer 211.

FIG. 3A is a cross section of a container 300, as may be used in the embodiment of FIG. 2, an attachment member 301 and disk-shaped bottle top covering member 305. The container 300 may be filled through a small opening 306 in the disk-shaped bottle top covering member 305. The container 300 as shown may have one or more scores 302 to make it easier to breach by bending or twisting so liquid stored inside the container cavity 303 may be released into foam typically surrounding it (as shown in FIG. 2). The one or more scores may extend part way or the entire way around the container 300. The one or more scores may also extend longitudinally or diagonally along a portion of the length of the container 300. The one or more scores may form any convenient design to facilitate a desired breach of the container 300. The container may also be breached by breaking, crushing, puncturing, unscrewing, pulling apart and the like. Similarly, the attachment member 301 as shown may also have a score 307 to make it easier to break by bending or twisting to separate the attachment member 301 from the container 300. At least a portion of the attachment member 301 is typically flexible, long and narrow.

The container 300 may be filled with liquid using a syringe (not shown), or other needle-like device, by inserting the syringe into the opening 306 in the disk-shaped bottle top covering member 305. Liquid inserted by the syringe passes through the channel 304 in the attachment member 301 on the way to the container cavity 303. The disk-shaped bottle top covering member 305 is typically positioned between the top of the bottle (including but not limited to bottle 100 in FIG. 1) and the bottle cap (including but not limited to 102 and 204 in FIGS. 1 and 2) and held in place there by the bottle cap (102 and 204). The disk-shaped bottle top covering member 305 may be adhered or otherwise attached to the bottle cap (102 and 204). When the bottle cap (102 and 204) is secured to the bottle (100) over the disk-shaped bottle top covering member 305, or if the disk-shaped bottle top covering member 305 is adhered or otherwise attached to the bottle cap (102 and 204), the opening 306 is covered, preventing liquid from escaping from the container 300.

FIG. 3B is a top view of the disk-shaped bottle top covering member 305 with opening 306.

FIG. 4A is a cross section of a container 400, a separable attachment member 411 (comprising a container-attachment member 401 and a bottle top covering attachment member 409), and loop-shaped bottle top covering 405, where the container 400 may be filled through a small opening 410 in the bottle top covering attachment member 409. The container 400 as shown may have one or more scores 402 to make it easier to breach by bending or twisting so liquid stored inside the container cavity 403 may be released into foam typically surrounding it (as shown in FIG. 1). The one or more scores may extend part way or the entire way around the container 400. The one or more scores may also extend longitudinally or diagonally along a portion of the length of the container 400. The one or more scores may form any convenient design to facilitate a desired breach of the container 400. The container may also be breached by breaking, crushing, puncturing, unscrewing, pulling apart and the like.

The container-attachment member 401 is typically flexible, long and narrow. The container-attachment member 401 and bottle top covering attachment member 409 may be connected by any convenient method. As shown, they are snapped together, where the container-attachment member 401 has one or more protuberances 407 that mate with one or more cavities, indentations, channels or grooves 408 in the bottle top covering attachment member 409. The bottle top covering attachment member 409 may also be threaded with the container attachment member 401 having a complementary thread. Depending on the materials and tolerances of the container-attachment member 401 and bottle top covering attachment member 409, a gasket, washer, sealant, and the like, may be used to ensure a water-tight seal so liquid doesn't leak from the container 400 until the separable attachment member 411 is intentionally separated.

The container 400 may be filled with liquid using a syringe (not shown), or other needle-like device, by inserting the syringe into the opening 410 in the container attachment member 401. Liquid inserted by the syringe passes through the channel 404 in the container attachment member 401 on the way to the container cavity 403. The loop-shaped bottle top covering 405 is shown "flipped up," but in typical operation is rotated 90 degrees about point 412 into the page (as shown in FIG. 4B). The loop-shaped bottle top covering 405 is typically positioned between the top of the bottle (100) and bottle cap (102 and 204) and held in place there by the bottle cap (102 and 204). The loop-shaped bottle top covering 405 may be adhered or otherwise attached to the bottle cap (102 and 204). The loop-shaped bottle top covering 405 has a hole 406 where a finger may be placed to make it easy to grab and affect movement of the separable attachment member 411.

FIG. 4B is a side view of the loop-shaped bottle top covering 405 attached at a point 412 to the bottle top covering attachment member 409 of the separable attachment member 411.

Figure 5:
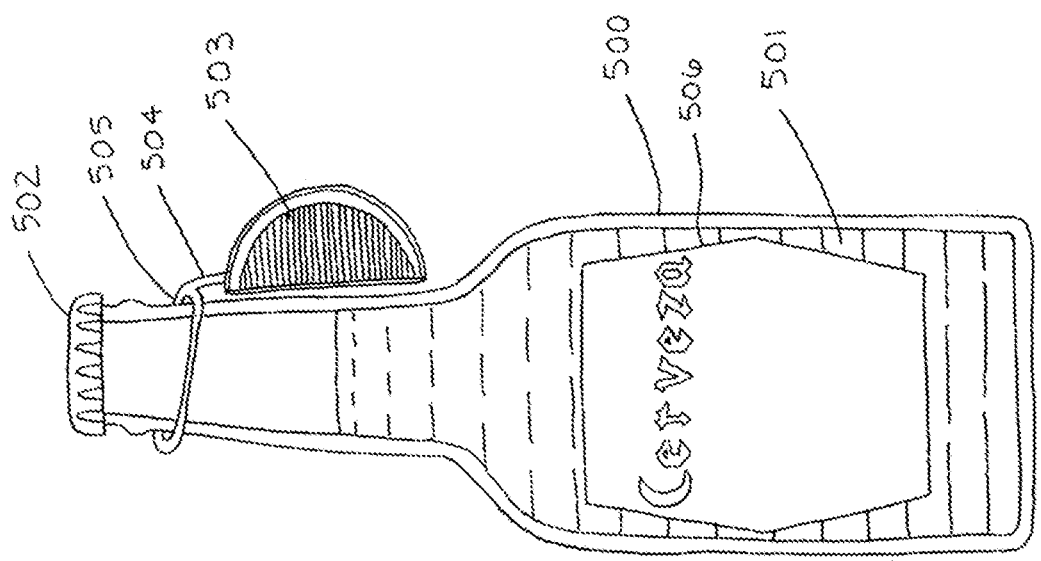
FIG. 5 is a front view of a bottled beverage with a fruit portion suspended outside the bottle by an external fastener with a ring at one end. The fruit portion may include an artificial citrus portion, including but not limited to an artificial lime wedge or slice containing lime-flavored liquid or other flavored soluble substance including but not limited to a lime-flavored soluble substance. The fruit portion may include a natural citrus portion, including but not limited to a natural lime wedge or slice, which may be dehydrated or otherwise preserved.

FIG. 5 is a front view of a beverage bottle 500 filled with liquid 501 and associated with a fruit portion 503. The fruit portion 503 may be any convenient fruit portion, including but not limited to a lime or lemon wedge or portion. In this embodiment, a fruit portion 503 is shown suspended outside the bottle 500 by an attachment member 504 with a loop 505 at one end. The fruit portion 503 may be an artificial or natural fruit portion, including but not limited to the fruit wedges described herein. The attachment member 504 may be suspended outside the bottle 500 by any convenient method, including a loop 505 encircling the neck of the bottle 500 or located under the bottle cap 502. The attachment member 504 may also be adhered or otherwise connected to the bottle 500, bottle cap 502 or bottle label 506 using any convenient method. The attachment member 504 may be separated from the fruit portion 503 using any convenient method, including the methods described in FIGS. 3A and 4A.

The fruit portion 503 may also be fastened to the outside of the bottle 500 or bottle cap 502 using a plastic wrap (including but not limited to Saran Wrap®), shrink wrap, cling wrap, plastic film, tape, glue, adhesive, a clip, snap, Velcro®, cable tie, a mating member and the like.

Figure 6:
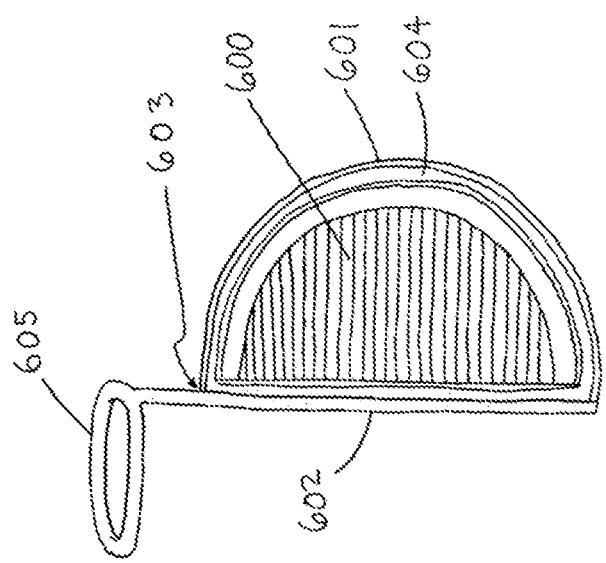
FIG. 6 is a front view of a fruit portion packaged in a removable protective covering including but not limited to vacuum-sealed plastic, which, as shown, includes a tear cord.

FIG. 6 is a front view of a fruit portion 600, including but not limited to a lime or lemon wedge, packaged in a removable covering 601. The fruit portion 600 may be a portion of a natural fruit or an artificial fruit. If the fruit is a natural fruit, it may be dehydrated or otherwise "dried" before packaging and optionally accompanied by a container of fruit-flavored liquid. If the fruit portion 600 is an artificial fruit, it may be made from non-dissolving foam. An artificial fruit may also be made from dissolving foam, gel, semi-solid, paste, lozenge, tablet and the like. If a portion of the artificial fruit dissolves, the removable covering is typically a watertight covering to prevent the portion of the artificial fruit from dissolving prior to the time the consumer wishes it to dissolve in the liquid, including but not limited to the liquid 501 in FIG. 5. The fruit portion 600 may comprise a non-soluble foam or mesh housing containing a soluble flavoring entity, such as a flavored tablet, bead or granule.

The removable covering 601 may be made of any convenient material including but not limited to clear, translucent or opaque plastic. Such plastic 601 may be rigid or flexible. Such plastic 601 may be vacuum-sealed plastic and may include a tear cord, Zip Lok® zipper, or any other convenient opening or sealing device or technique. In the embodiment of FIG. 6, the semi-rigid member 602 is used as a tear cord, where in FIG. 6 it separates from the plastic covering 601 at a point 603. When the semi-rigid member 602 separates from the plastic covering 601 the natural fruit or artificial fruit portion 600 can be removed from the plastic covering 601 from the opening created. The semi-rigid member 602 optionally has a ring 605 at one end (shown in FIG. 6) which may encircle the neck of the bottle 500 or may be placed under the bottle cap 502; although, the semi-rigid member 602 may be connected in any convenient manner to the bottle 500, bottle cap 502 or label 506. If the plastic covering were vacuum sealed, the gap 604 shown may not exist.

Figure 7:
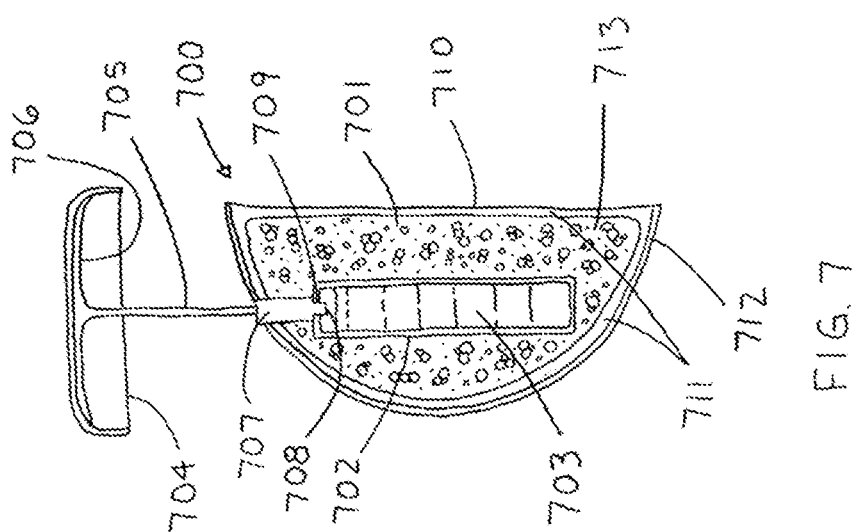
FIG. 7 is a cross section of an assembly comprising an artificial fruit portion attached to a bottle cap by an attachment member, where the artificial fruit portion is shown here as a wedge, including but not limited to a lime or lemon wedge, and comprises an elastic foam body and a container containing fruit-flavored liquid, including but not limited to lime- or lemon-flavored liquid.

FIG. 7 is a cross section of an assembly 700 comprising an artificial fruit 710, including but not limited to an artificial lime or lemon, a container 702, an attachment member 705 and a bottle cap 704. The attachment member 705 is comprised of a bottle top covering end 706 and a container-connecting end 707, where the container-connecting end 707 has a protuberance 708 that fits into a mating opening 709 in the container 702 and seals the container liquid 703 therein. The assembly 700 comprises a foam body 701 enclosing all or a portion of the container 702. The artificial fruit 710 typically represents only a portion of a fruit, including but not limited to a triangular fruit wedge. In this example, the container liquid 703 in the container 702 may be real fruit juice, artificial fruit juice, fruit flavored liquid or another desired liquid. In this example, the container 702 is attached to the bottle cap 704 by the bottle top covering end 706. The attachment member 705 typically is flexible. The bottle top covering end 706 may be permanently attached to the bottle cap 704, typically by adhesive or molding, or separable from the bottle cap 704. When the connecting link 705 is flexible, the container connecting end 707 is typically more rigid. The container connecting end 707 may be press fit into the opening 709 in the container 702. The container connecting end 707 may also be snap fit in, screwed in, or connected to the container 702 using any other convenient sealable, yet separable, method.

The attachment member 705 may be molded to provide the desired shape and treated to provide the desired physical properties. Various plastic materials can be used to be shaped into the various forms comprising the attachment member 705, treating portions differently to be rigid or flexible, as required.

Typically, when the container 702 is separated from the attachment member 705, container liquid 703 can escape from the container 702 through the opening 709. Typically, the container liquid 703 escapes from the container 702 by pouring or squeezing the container 702. For example, after the bottle cap 704/102 is removed from the bottle 100, the bottle cap 704 is separated from the artificial fruit 710 by snapping the container connecting end 707 out of the opening 709, and fruit juice can be poured or squeezed into the beverage 101 from the container 702 inside the artificial fruit 710.

The container 702 can be further made to release the container liquid 703, typically by snapping the container 702, or otherwise breaking, crushing, puncturing, unscrewing, pulling apart, and the like. Although not shown in FIG. 7, the container 702 may comprise a score, like the score 213 in FIG. 2, to facilitate separating the container 702 by snapping it into two pieces. When the container 702 is separated, the container liquid 703 is released and enters the surrounding foam body 701. If desired, the artificial fruit 710 can then be re-inserted into the bottle 100 and dropped into the beverage 101. The foam body 701 of the artificial fruit 710 regulates the rate at which the released container liquid 703 is allowed to mix with the beverage 101. The density and type of pores in the foam body 701 are selected to obtain a desired mixing rate. Different densities and types of foam may be selected according to the container liquid 703. For instance, a container liquid 703 with high surface tension may use a foam body 201 with less dense foam or foam with larger pores.

To enhance the realism of the artificial fruit 710, the foam body 701 is typically textured and colored to resemble a real fruit. In addition to visual properties, the foam body 701 can also be selected to approximate the mechanical properties of a real fruit, including its compliance and damping. For instance, in the case where the artificial fruit 710 is an artificial lime, the circular perimeter 712 is typically a dark lime green color and denser than the rest of the artificial fruit 710; the middle layer 711 is typically a light yellow color; and the inner portion 713 is typically textured like the pulp of a real lime and is a darker yellow color than the light yellow color of the middle layer 711.

Figure 8B:
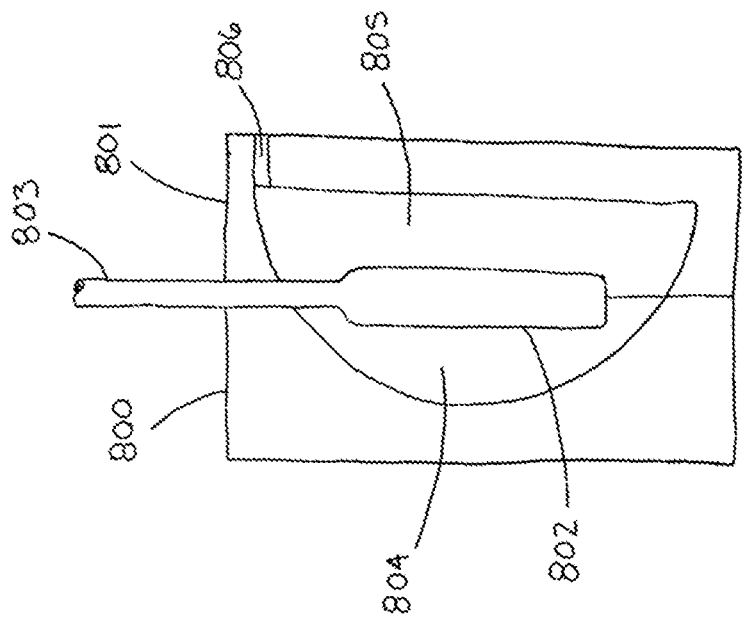
FIGS. 8A and 8B are cross sections of a mold for forming an artificial fruit portion, including but not limited to a wedge.
Figure 8A:
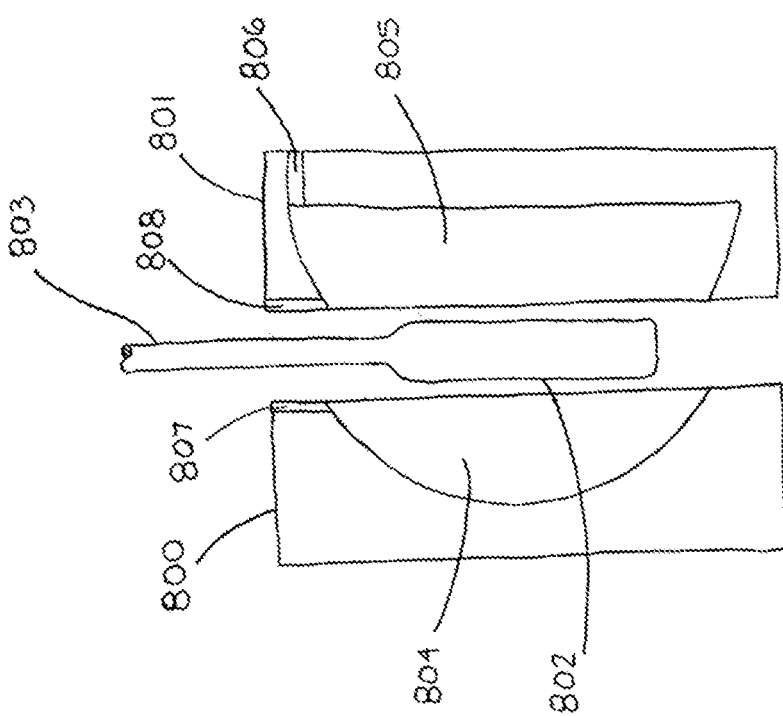

FIG. 8A is a cross section of a mold for forming an artificial fruit portion, including but not limited to an artificial lime or lemon wedge. As shown in FIG. 8A, the mold is open. FIG. 8B shows the mold closed. 800 is a first side of the mold and 801 is a second side of the mold. In general, there may be any number of pieces to the mold. The mold may separate along any convenient parting line of the artificial fruit portion such that the artificial fruit portion may be removed after forming. As shown, the molded artificial fruit portion must be compliant to be removed from the second side of the mold 801. Alternately choosing a parting line in the plane of the cross section may make the artificial fruit portion easier to remove when the two sides of the mold 800 and 801 are opened.

As shown, the two mold pieces come together around a liquid container spacer 802 with stem spacer 803, where the liquid container spacer 802 and stem spacer 803 create a molded cavity inside the artificial fruit portion into which a liquid container may later be inserted. Alternately, the two mold pieces may come together around a liquid container such that the liquid container is never removed from the artificial fruit portion. The first side of the mold 800 contains a first fruit portion cavity 804 and a first stem cavity 807. The second side of the mold 801 contains a second fruit portion cavity 805 and a second stem cavity 808. The two fruit portion cavities 804 and 805 enclose the liquid container spacer 802, whereas the two stem cavities 807 and 808 enclose the stem spacer 803 when the two sides of the fruit portion mold 800 and 801 come together, as shown in FIG. 8B. The passage 806 shown on the second side of the mold 801 permits injection of the desired molding material to form the artificial fruit portion around the liquid container spacer 802 by filling the cavity which is sealed by bringing together of the first and second sides of the mold 800 and 801.

Figure 9:
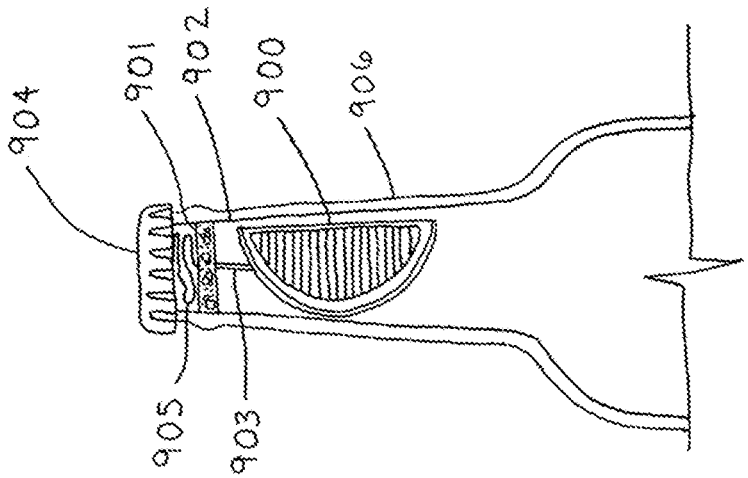

FIG. 9 is a cross section of the top portion of a beverage container 906 comprising an artificial fruit portion 900, including but not limited to an artificial lime or lemon wedge, that is suspended in the beverage container by a suspending member 903 comprising a support member 901, including but not limited to a piece of foam, cork and the like, at one end and attached to the artificial fruit portion 900 at the other end. As shown in FIG. 9, the support member 901 is positioned through contact with the inside wall 902 of the beverage container 906. Typically the support member 901 is supported by press fitting, snap fitting, screwing and the like. The support member 901 is typically attached to the bottle cap 904 by a removal member 905 including but not limited to a cord, string, rubber band, thread, wire, spring, and the like. The removal member 905 may also not be attached to the bottle cap 904 and simply comprise a tab, loop or other means by which the support member 901 may be removed by the beverage consumer after removal of the bottle cap 904.

Figure 10:
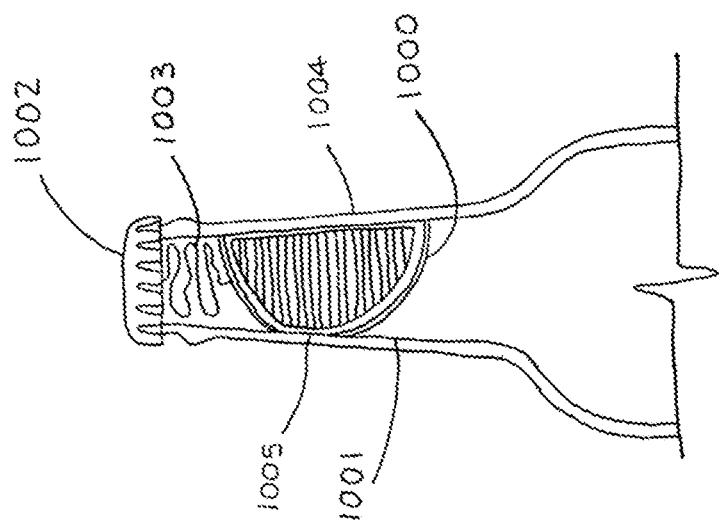
FIG. 10 is a cross section of the top portion of a beverage vessel comprising a fruit portion, including but not limited to a lime wedge, that is suspended in the beverage vessel using contact between the fruit portion and the beverage vessel.

FIG. 10 is a cross section of the top portion of a beverage container 1004 comprising an artificial fruit portion 1000, including but not limited to an artificial lime or lemon wedge, that is suspended in the beverage container 1004 using contact 1005 between the artificial fruit portion 1000 and the inside surface 1001 of the beverage container 1004. The artificial fruit portion 1000 may be removed from the beverage container 1004 using a removal member 1003 which may be a cord, string, rubber band, thread, wire, spring, tab, loop, and the like. The removal member 1003 may be handled directly for removal of the artificial fruit portion 1000 or the removal member 1003 may be attached to the bottle cap 1002.

FIG. 11A is a cross section of a beverage container 1106 comprising a beverage 1105 and an artificial fruit portion 1100, including but not limited to an artificial lime or lemon wedge. Inside the artificial fruit portion is a liquid container 1107 comprising a first member 1102 and a second member 1103. The liquid container 1107 releases its liquid contents inside the artificial fruit portion 1100 where the liquid contents then diffuse through at least a portion of the artificial fruit portion 1100 into the beverage 1105 when the artificial fruit portion 1100 is lowered into the beverage 1105, as shown in FIG. 11B. As shown, the artificial fruit portion 1100 is typically initially in contact with the inner surface 1101 of the beverage container 1106, and the artificial fruit portion 1100 is typically compressed to keep the first member 1102 in sealed contact with the second member 1103 to prevent the liquid contents from escaping.

In FIG. 11B, the artificial fruit portion 1100 has been lowered into the liquid 1105, thereby releasing the pressure keeping the first member 1102 in sealed contact with the second member 1103, and allowing the first member 1102 to separate from the second member 1103. Typically, such separation is induced by a separating pressure between the first member 1102 and the second member 1103. Such separating pressure may be provided by any convenient method, including a spring, including but not limited to a compression spring or extension spring, a living hinge, and the like.

The first member 1102 and second member 1103 may be hinged, such as by the hinge 1104. When hinged, the hinge may comprise a pin by which the sides rotate relative to each other. The hinge may also be a living hinge or any other hinging means.

FIG. 12A is a side view of one embodiment of the liquid container 1204, corresponding to the liquid container 1107 of FIGS. 11A and 11B. In this embodiment, the liquid container 1204 has a first member 1200 and a second member 1201 joined by a pinned hinge 1202. Not shown in the figure is a spring for applying a separating pressure between the first member 1200 and second member 1201. Such a spring may be associated with the pinned hinge 1202. There may also be a compression spring between the first member 1200 and second member 1201.

FIG. 12B is a cross section of the liquid container 1204 of FIG. 12A taken at section A-A of FIG. 12A. In this embodiment of the liquid container 1204, there is a first member 1200 and second member 1201 that mate together to form a liquid seal to contain the liquid contents of the liquid container 1204. In this embodiment, to form a liquid seal, the second member 1201 has a channel protuberance 1203 along its entire perimeter that fits into a mating channel valley 1202 along the entire perimeter of the first member 1200.

FIG. 13A is a front view of a bottled beverage with a fruit portion 1300, including but not limited to an artificial or natural lime or lemon wedge, packaged in a removable protective covering 1301 and suspended outside the bottle 1302 by an external fastener 1303. The protective covering 1301 may be comprised of transparent, opaque or semi-translucent material, and it may be made from any convenient, typically sanitizable, material including but not limited to plastic, foil, glass, foam, and the like. The external fastener 1303 may comprise a clip, plastic wrap, shrink wrap, cling wrap, plastic film, tape, glue, adhesive, snap, Velcro, cable tie, wire, a mating member, and the like. In this embodiment, the protective covering 1301 has a tear cord 1304 for breaching the protective covering 1301 and allowing removal of the fruit portion 1300. The tear cord 1304 may have a portion for grasping, such as the tab 1305. The tear cord 1304 may permanently sever the protective covering 1301 or it may serve to separate to portions of the protective covering 1301 such as achieved by a zipper or Zip Lok connector. The protective covering 1301 is connected to the external fastener 1303 at location 1306. Such connection may be achieved by any convenient method including the use of glue, clipping, mating portions, adhesive, tape, Velcro, and the like. The fruit portion 1300 may comprise a non-soluble foam or mesh housing containing a soluble flavoring entity, such as a flavored tablet, bead or granule.

FIG. 13B is a cross section plan view of the embodiment of FIG. 13A taken through section A-A. The fruit portion 1300 is shown in the removable protective covering 1301. The protective covering 1301 is connected to the external fastener 1303 at location 1306. A convenient external fastener 1303 is double-stick tape or other adhesive. Another convenient external fastener 1303 is a plastic or metal clip. The external fastener 1303 holds the fruit portion with or in convenient relation to the beverage vessel 1302 including but not limited to a bottle neck. The tear cord 1304 is moved to provide an opening in the protective covering 1301 for removing at least a portion of the fruit portion or flavored fluid associated with the fruit portion.

FIG. 14A is a front view of a bottled beverage with a fruit portion 1400, including but not limited to an artificial or natural lime or lemon wedge, packaged in a removable protective covering 1401 and suspended outside the bottle 1402 by an external fastener 1403. The protective covering 1401 may be comprised of transparent, opaque or semi-translucent material, and it may be made from any convenient, typically sanitizable, material including but not limited to plastic, foil, glass, foam, and the like. The external fastener 1403 may comprise a clip, plastic wrap, shrink wrap, cling wrap, plastic film, tape, glue, adhesive, snap, Velcro, cable tie, wire, a mating member, and the like. In this embodiment, the protective covering 1401 may be breached by pulling its flanged base 1404 away from the external fastener 1403 and allowing removal of the fruit portion 1400. The protective covering 1401 may also comprise a tear cord (not shown) to separate to portions of the protective covering 1401. The protective covering 1401 is connected to the external fastener 1403 by a flanged base 1404. Such connection may be achieved by any convenient method including the use of glue, clipping, mating portions, adhesive, tape, Velcro, and the like. The fruit portion 1400 may comprise a non-soluble foam or mesh housing containing a soluble flavoring entity, such as a flavored tablet, bead or granule.

FIG. 14B is a cross section plan view of the embodiment of FIG. 14A taken through section A-A. The fruit portion 1400 is shown in the removable protective covering 1401. The protective covering 1401 is connected to the external fastener 1403 by its flanged base 1404. A convenient external fastener 1403 is double-stick tape or other adhesive. The external fastener 1403 may be the beverage vessel label. Another convenient external fastener 1403 is a plastic or metal clip. The external fastener 1403 holds the fruit portion with or in convenient relation to the beverage vessel 1402 including but not limited to a bottle neck.

Figure 15A:
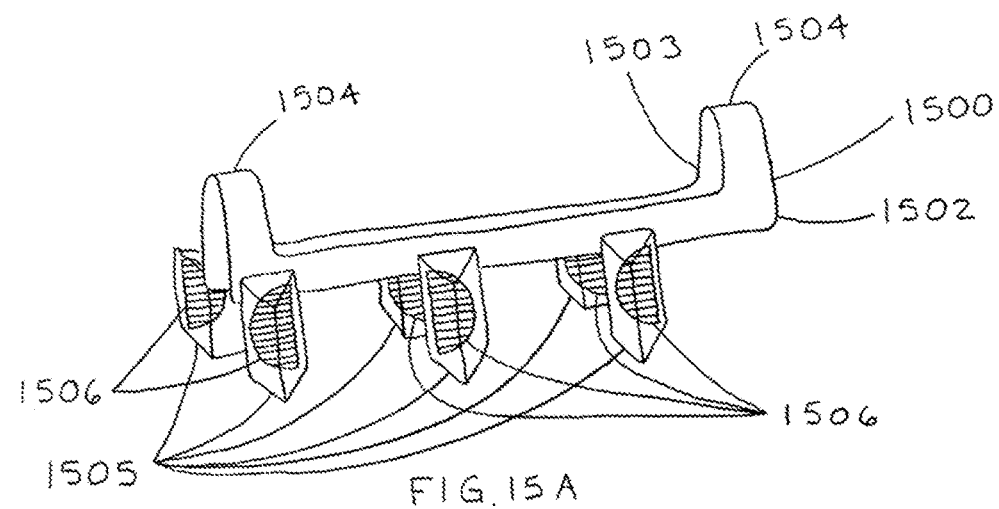
FIG. 15A is a perspective view of an apparatus for holding one or more fruit portions in convenient proximity to one or more beverage vessels.

FIG. 15A is a perspective view of an embodiment of an apparatus 1500 for holding one or more fruit portions 1506 in convenient proximity to one or more beverage vessels. In this embodiment, the apparatus 1500 is a "hanging" apparatus comprising a first side 1502 and a second side 1503 and a bends 1504. Typically the apparatus 1500 is made of cardboard, paper, plastic or wood, but may be made from any convenient material. The bend 1504 is typically a fold or crease that creates two parallel sides, 1502 and 1503, from a single sheet of material. The bends 1504 are typically used to support the apparatus 1500 on the handle portion of a beverage vessel carrier, including but not limited to a 6-pack bottle carton.

In this embodiment, fruit portions 1506 are contained in protective coverings 1505 that are attached to the sides 1502 and 1503 of the apparatus 1500. Each of the fruit portions 1506 may include an artificial citrus portion, including but not limited to an artificial lime wedge or slice containing lime-flavored liquid or other flavored soluble substance including but not limited to a lime-flavored soluble substance. Each of the fruit portions 1506 may include a natural citrus portion, including but not limited to a natural lime wedge or slice, which may be dehydrated or otherwise preserved. The protective coverings 1505 may be comprised of transparent, opaque or semi-translucent material, and may be made from any convenient, typically sanitizable, material including but not limited to plastic, foil, glass, foam, and the like. In a convenient embodiment, a portion of the protective coverings 1505 comprises translucent plastic and another portion comprises foil which can be breached to release one of the fruit portions 1506. The protective coverings 1505 may be attached to any portion of the apparatus 1500, such as the sides 1502 and 1503. Such attachment may include a clip, plastic wrap, shrink wrap, cling wrap, plastic film, tape, glue, adhesive, snap, Velcro, cable tie, wire, mating members, and the like. Any of the fruit portions 1506 may comprise a non-soluble foam or mesh housing containing a soluble flavoring entity, such as a flavored tablet, bead or granule.

Figure 15B:
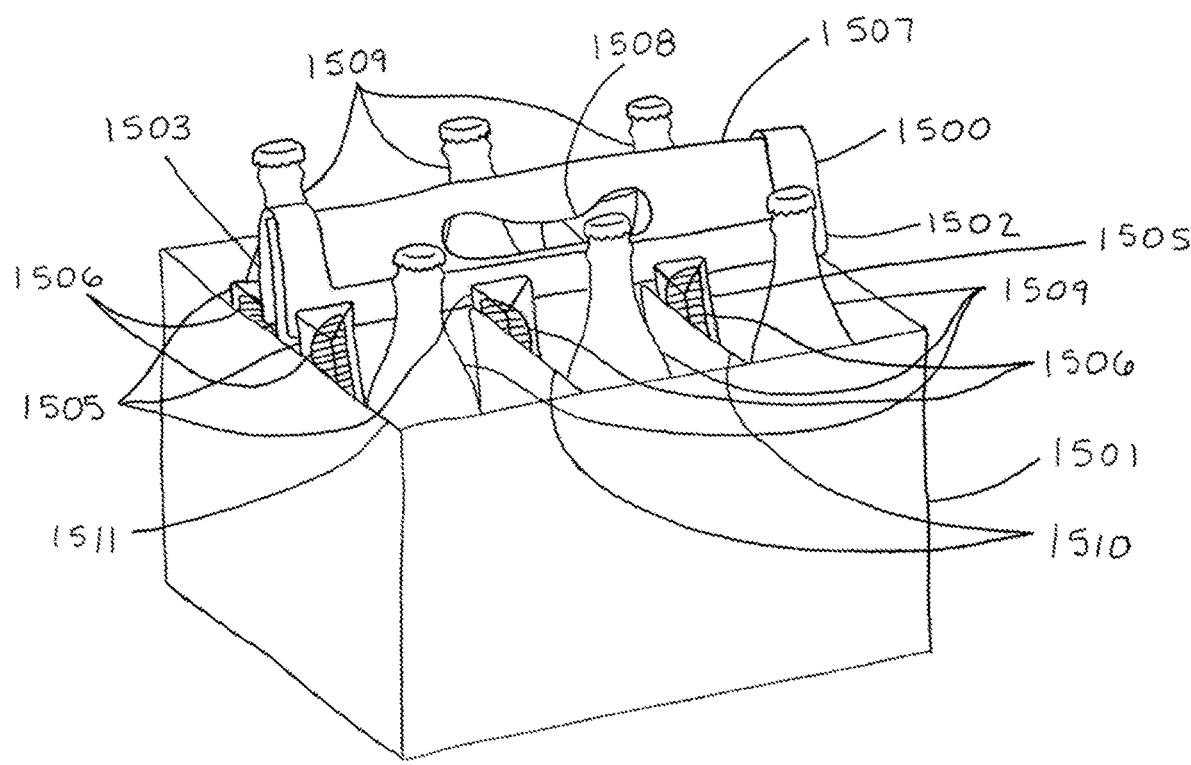
FIG. 15B is a perspective view of the apparatus of FIG. 15A placed in functional relationship to a beverage vessel carrier carrying beverage vessels, including bottles. In this figure, the apparatus is placed over the handle portion of the beverage vessel carrier.

FIG. 15B is a perspective view of the apparatus 1500 of FIG. 15A placed in functional relationship to a beverage vessel carrier 1501 carrying beverage vessels 1509, including but not limited to bottles. In this figure, the apparatus 1500 is placed over the handle portion 1507 with handle hole 1508 of the beverage vessel carrier 1501. The apparatus 1500 may be attached to the handle portion 1507 by clips, glue, tape, staples, snaps, Velcro, mating members, and the like. In this embodiment, when the apparatus 1500 is placed over the handle portion 1507, the protective coverings 1505 reside between the vessels 1509 and the beverage vessel carrier 1501. Typically the protective coverings 1505 reside between the vessels 1509 and the sides 1511 or separators 1510 of the beverage vessel carrier 1501.

FIG. 16 is a perspective view of an apparatus 1600 for holding one or more fruit portions, such as portions 1604, 1606, 1608 and 1610, with or in convenient proximity to one or more beverage vessels 1601, including cans. In this embodiment, the apparatus 1600 also holds the beverage vessels 1601 together for carrying and storing. Typically the apparatus 1600 is made of cardboard, paper, plastic or wood, but may be made from any convenient material. Any of the fruit portions 1604, 1606, 1608 and 1610 may comprise a non-soluble foam or mesh housing containing a soluble flavoring entity, such as a flavored tablet, bead or granule.

In this embodiment, fruit portions 1604, 1606, 1608 and 1610, are contained in protective coverings 1603, 1605, 1607 and 1609, respectively, that are attached to the apparatus 1600. Each of the fruit portions 1604, 1606, 1608 and 1610 may include an artificial citrus portion, including but not limited to an artificial lime wedge or slice containing lime-flavored liquid or other flavored soluble substance including but not limited to a lime-flavored soluble substance. Each of the fruit portions 1604, 1606, 1608 and 1610 may include a natural citrus portion, including but not limited to a natural lime wedge or slice, which may be dehydrated or otherwise preserved. The protective coverings 1603, 1605, 1607 and 1609 may be comprised of transparent, opaque or semi-translucent material, and may be made from any convenient, typically sanitizable, material including but not limited to plastic, foil, glass, foam, and the like. In a convenient embodiment, a portion of the protective coverings 1603, 1605, 1607 and 1609 comprises translucent plastic and another portion comprises foil which can be breached to release one of the fruit portions 1604, 1606, 1608 and 1610. The protective coverings 1603, 1605, 1607 and 1609 may be attached to any portion of the apparatus 1600, such as on the top 1603 and 1607 or the bottom 1605 and 1609. The protective coverings 1603, 1605, 1607 and 1609 may also be attached to the edge of the apparatus 1600. Such attachment may comprise a clip, plastic wrap, shrink wrap, cling wrap, plastic film, tape, glue, adhesive, snap, Velcro, cable tie, wire, mating members, and the like.

FIG. 16 is a perspective view of the apparatus 1600 also serving as a beverage vessel carrier carrying beverage vessels 1601, including but not limited to cans. In this figure, the apparatus 1600 includes handle holes 1602 for carrying.

In this embodiment, the protective coverings 1605 and 1609 reside between the vessels 1601, and protective coverings 1603 and 1607 reside on the top of the apparatus 1600.

FIG. 17A is a perspective view of a fruit portion 1702 in a protective covering 1701 in a first position not in contact with a beverage vessel 1700. FIG. 17B is a perspective view of the fruit portion 1702 in the protective covering 1701 in a second position 1703 secured to the beverage vessel 1700. FIG. 17A is a perspective view of a protective covering 1701 for holding a fruit portion 1702 in convenient proximity to a beverage vessel 1700, including a can. The fruit portion 1702 may include an artificial citrus portion, including but not limited to an artificial lime wedge or slice containing lime-flavored liquid or other flavored soluble substance including but not limited to a lime-flavored soluble substance. The fruit portion 1702 may include a natural citrus portion, including but not limited to a natural lime wedge or slice, which may be dehydrated or otherwise preserved. The fruit portion 1702 may comprise a non-soluble foam or mesh housing containing a soluble flavoring entity, such as a flavored tablet, bead or granule.

The protective covering 1701 may comprise transparent, opaque or semi-translucent material, and may be made from any convenient, typically sanitizable, material including but not limited to plastic, foil, glass, foam, and the like. In a convenient embodiment, a portion of the protective covering 1701 comprises translucent plastic and another portion comprises foil which can be breached to release the fruit portion 1702.

In FIG. 17B, the protective covering 1701 is shown in a second position attached to the top of beverage vessel 1700. Such attachment may comprise a clip, plastic wrap, shrink wrap, cling wrap, plastic film, tape, glue, adhesive, snap, Velcro, cable tie, wire, mating or overlapping members, compressive force, friction, and the like. For example, the protective covering 1701 may snap onto the top of a beverage can.

FIG. 18A is a perspective view of a fruit portion 1800 inside a protective covering 1801. The protective covering 1801 may comprise transparent, opaque or semi-translucent material, the material may be rigid or flexible, and may be made from any convenient, typically sanitizable, material including but not limited to plastic, foil, glass, foam, paper, cardboard, metal, and the like. The protective covering 1801 may be vacuum-sealed plastic and may include a perforation, tear cord, Zip Lok® zipper, or any other convenient opening or sealing device or technique. In FIG. 18A, the protective covering 1801 comprises a Zip Lok zipper with a sliding member 1803 and mating tracks 1802 which are separated when the sliding member 1803 is moved in one direction, and are fastened together when the sliding member 1803 is moved in the other direction. In a convenient embodiment, a portion of the protective covering 1801 comprises translucent plastic and another portion comprises foil which can be breached to release the fruit portion 1800. The fruit portion 1800 may comprise any of the artificial or natural fruit portions described throughout this subject invention disclosure. The fruit portion 1800 may comprise a non-soluble foam or mesh housing containing a soluble flavoring entity, such as a flavored tablet, bead or granule.

FIG. 18B is a perspective view of one or more fruit portions 1807 inside a protective covering 1805 and attached to a first embodiment 1804 of a beverage vessel carrier. In FIG. 18B, the protective covering 1805 comprises a Zip Lok zipper with a sliding member 1811 and mating tracks 1810. The first embodiment 1804 has holes 1806 to facilitate carrying. Such a first embodiment 1804 may be used to store and carry twelve beverage vessels, including but not limited to beverage bottles or cans. In FIG. 18B the protective covering 1805 is shown attached to the first embodiment 1804 of the beverage vessel carrier. Such attachment may comprise a clip, plastic wrap, shrink wrap, cling wrap, plastic film, tape, glue, adhesive, snap, Velcro, cable tie, wire, mating members, and the like. Any of the fruit portions 1807 may comprise a non-soluble foam or mesh housing containing a soluble flavoring entity, such as a flavored tablet, bead or granule.

FIG. 18C is a perspective view of one or more fruit portions 1814 inside a protective covering 1809 and attached to a second embodiment 1808 of a beverage vessel carrier. In FIG. 18C, the protective covering 1809 comprises a Zip Lok zipper with a sliding member 1813 and mating tracks 1812. Such a second embodiment 1808 may be used to store and carry six beverage vessels, including but not limited to beverage bottles or cans. In FIG. 18C the protective covering 1809 is shown attached to the second embodiment 1808 of the beverage vessel carrier. Such attachment may comprise a clip, plastic wrap, shrink wrap, cling wrap, plastic film, tape, glue, adhesive, snap, Velcro, cable tie, wire, mating members, and the like. Any of the fruit portions 1814 may comprise a non-soluble foam or mesh housing containing a soluble flavoring entity, such as a flavored tablet, bead or granule.

FIG. 18D is a perspective view of one or more fruit portions 1819 inside a protective covering 1816 and attached to a beverage vessel 1815. In FIG. 18D, the protective covering 1816 comprises a Zip Lok zipper with a sliding member 1818 and mating tracks 1817. In FIG. 18D the protective covering 1816 is shown attached to the beverage vessel 1815, including but not limited to a beverage bottle or can. Such attachment may comprise a clip, plastic wrap, shrink wrap, cling wrap, plastic film, tape, glue, adhesive, snap, Velcro, cable tie, wire, mating members, and the like. Any of the fruit portions 1819 may comprise a non-soluble foam or mesh housing containing a soluble flavoring entity, such as a flavored tablet, bead or granule.

As stated in the Summary Of The Invention, a protective covering may comprise foil, plastic, fabric, glass, paper, cardboard, and the like, or any other convenient sanitizable, breachable material. The protective covering may be transparent, opaque or translucent. When a fruit portion comprises a soluble material, the fruit portion may be made entirely of soluble material or it may be made from non-soluble foam, rubber, plastic, fabric and the like and contain the soluble material along with pores, valves, holes, mesh passageways, and the like to allow beverage vessel fluid to flow over and/or otherwise mix with the soluble material. A convenient embodiment comprises a non-soluble foam or mesh fruit wedge, including but not limited to a lime wedge or slice, comprising soluble material, including but not limited to impregnated soluble flavoring beads or granules, and stored in a tearable foil protective covering adhered to a beverage bottle or can. The non-soluble foam or mesh fruit wedge may also form a housing into which one or more soluble flavoring tablets is inserted. The housing may be elastic. The housing may be a sack or pouch. The housing may comprise one or more pockets for inserting flavored soluble tablets, beads or granules. The tearable foil protective covering may have a perforation to facilitate breaching. Typically, the tearable foil protective covering is torn open, and the non-soluble foam or mesh fruit wedge containing the one or more soluble tablets is removed from the tearable foil protective covering and dropped into, or otherwise introduced into, a beverage bottle or can. As the consumer consumes the beverage liquid, the beverage liquid passes through the non-soluble foam or mesh fruit wedge and over the one or more soluble tablets, thus dissolving a portion of the one or more soluble tablets and thereby mixing the intended flavoring with the beverage liquid during consumption. The size, surface area and number of tablets may be selected based on their dissolution rate and the amount of flavoring desired.

FIG. 19A is a cross section of an embodiment of a beverage vessel 1900 in an unactivated configuration where a first fluid 1901 is separated from a second fluid 1902. The beverage vessel 1900 may be a beverage can. The first fluid 1901 may be a primary beverage liquid to be consumed, including but not limited to beer or a soft drink, and the second fluid 1902 may be a liquid flavoring or other additive, including but not limited to a fruit flavoring or a shot of alcohol. In the beverage vessel 1900, the second fluid 1902 is contained in a container comprising a first surface 1904 and a second surface 1903. In the beverage vessel 1900, the first surface 1904 comprises a portion of the top of the beverage vessel. In the beverage vessel 1900 the second surface 1903 is connected to the first surface 1904 and the second surface 1903 comprises a portion which is breachable. The second surface 1903 may comprise any convenient breachable material, including but not limited to plastic, foil, metal, and the like.

As shown in this embodiment of the beverage vessel 1900, a portion of the second surface 1903 is connected to a portion of the first surface 1904 at a connection location 1905. The connection may comprise friction, pressure, mating members, locking members, adhesive, crimping, and the like. The connection may comprise one or more connection points. The connection may comprise a continuous connection region or line of connection.

As shown in FIG. 19A, the first surface 1904 of the embodiment of the beverage vessel 1900 comprises a tab 1906 for breaching the beverage vessel. Such tabs are known to those skilled in the art of breaching beverage containers such as soft drink and beer cans. Tab 1906 is connected to the first surface 1904 by tab connector 1907. Such a tab connector 1907 may comprise a rivet, post, screw, or any convenient connection means. When the tab 1906 is lifted away from the first surface 1904, tab end 1908 presses against a breachable portion 1909 of the first surface 1904 causing a breach in the first surface 1904 where the breachable portion 1909 includes the breach point 1910. The breach point 1910 may comprise a score that facilitates the breach.

FIG. 19B is a cross section of the embodiment of the beverage vessel 1900 of FIG. 19A which is now in an activated configuration for mixing the first fluid 1901 with the second fluid 1902. In FIG. 19B the tab is now in an activated tab configuration 1911 where the tab connector is in an activated tab-connector configuration 1912, and the tab end 1908 is in contact with the breachable portion which is now in an activated breachable-portion configuration 1913. This activated breachable-portion configuration 1913 causes the breachable portion to breach the second surface, producing a third surface 1916 and a fourth surface 1915 and a gap between them where the second fluid 1902 may pass into and mix with the first fluid 1901 at a mixing location 1914.

Thus, when a consumer desires to consume the first fluid 1901 and second fluid 1902 and breaches the beverage vessel 1900 using the tab 1906, the second surface 1903 of the container comprising the second fluid 1902 is also breached, allowing the first fluid 1901 and second fluid 1902 to mix prior to consumption.

FIG. 20A is a cross section of an embodiment of a beverage vessel 2000 in an unactivated configuration where a first fluid 2001 is separated from a second fluid 2002. The beverage vessel 2000 may be a beverage can. The first fluid 2001 may be a primary beverage liquid to be consumed, including but not limited to beer or a soft drink, and the second fluid 2002 may be a liquid flavoring or other additive, including but not limited to a fruit flavoring or a shot of alcohol. In the beverage vessel 2000, the second fluid 2002 is contained in a container comprising a first surface 2006, a second surface 2005 and a side surface 2003. In the beverage vessel 2000, the first surface 2006 comprises a portion of the top of the beverage vessel. In the beverage vessel 2000 the second surface 2005 is connected to the side surface 2003 which is attached to the first surface 2006. The second surface 2005 comprises a portion which is breachable. The second surface 2005 may comprise any convenient breachable material, including but not limited to plastic, foil, metal, and the like. The side surface 2003 may be a circular ring to which a circular second surface 2005 is attached.

As shown in this embodiment of the beverage vessel 2000, a portion of the side surface 2003 is connected to a portion of the first surface 2006 at a connection location 2011. The connection may comprise friction, pressure, mating members, locking members, adhesive, crimping, and the like. The connection may comprise one or more connection points. The connection may comprise a continuous connection region or line of connection.

Between the first surface 2006 and second surface 2005 is a breaching member 2012 with a breaching member contact point 2014 and a breaching surface 2013. The breaching surface 2013 may comprise a pointed end, a sharp edge, and the like for breaching the second surface 2005. A breaching-member mount 2004 of the breaching member 2012 may be connected to the beverage vessel 2000 at connection location 2011 in a similar manner as the first surface 2006 and side surface 2003 are connected at connection location 2011. Typically, the breaching member 2012 is capable of flexing relative to the breaching-member mount 2004. When the side surface 2003 is a circular ring, it may comprise the breaching-member mount 2004.

As shown in FIG. 20A, the first surface 2006 of the embodiment of the beverage vessel 2000 comprises a tab 2007 for breaching the beverage vessel. Such tabs are known to those skilled in the art of breaching beverage containers such as soft drink and beer cans. Tab 2007 is connected to the first surface 2006 by tab connector 2008. Such a tab connector 2008 may comprise a rivet, post, screw, or any convenient connection means. When the tab 2007 is lifted away from the first surface 2006, tab end 2015 presses against a breachable portion 2009 of the first surface 2006 causing a breach in the first surface 2006 where the breachable portion 2009 includes the breach point 2010. The breach point 2010 may comprise a score that facilitates the breach.

FIG. 20B is a cross section of the embodiment of the beverage vessel 2000 of FIG. 20A which is now in an activated configuration for mixing the first fluid 2001 with the second fluid 2002. In FIG. 20B the tab is now in an activated tab configuration 2016 where the tab connector is in an activated tab-connector configuration 2022, and the tab end 2015 is in contact with the breachable portion which is now in an activated breachable-portion configuration 2017. This activated breachable-portion configuration 2017 causes the breachable portion to press against the breaching member contact point 2014 causing the breaching member to take on an activated breaching-member configuration 2018 where the breaching surface takes on an activated breaching-surface configuration 2013 and breaches the second surface, producing a third surface 2020 and a fourth surface 2019 and a gap between them where the second fluid 2002 may pass into and mix with the first fluid 2001 at a mixing location 2021.

Thus, when a consumer desires to consume the first fluid 2001 and second fluid 2002 and breaches the beverage vessel 2000 using the tab 2007, the second surface 2005 of the container comprising the second fluid 2002 is also breached, allowing the first fluid 2001 and second fluid 2002 to mix prior to consumption.

Figure 21:
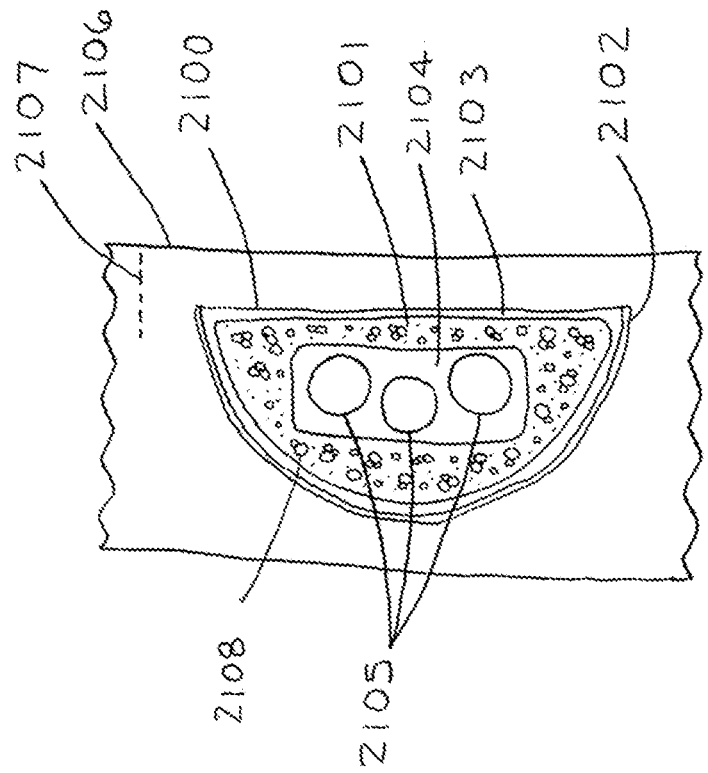
FIG. 21 is a non-soluble housing in the image of a fruit portion with a retaining region for retaining a soluble substance. The fruit portion is stored in a protective covering which may be attached to, or otherwise associated with, a beverage vessel comprising beverage liquid with which the soluble substance is to be dissolved and mixed prior to consumption.

FIG. 21 is a cross section plan view of a fruit portion comprising a non-soluble housing 2100 containing a soluble flavoring entity 2105, including but not limited to one or more flavored tablets, beads, granules, and the like, where the non-soluble housing 2100 is stored in a protective covering 2106. The non-soluble housing 2100 may be elastic. In general, the non-soluble housing 2100 may comprise non-soluble foam, rubber, plastic, fabric, and the like. The non-soluble housing 2100 may comprise pores 2108, valves, holes, mesh passageways, and the like to allow beverage liquid from a beverage vessel to flow over and/or otherwise mix with the soluble flavoring entity 2105. In general, the protective covering 2106 may comprise foil, plastic, metalized plastic, fabric, glass, paper, cardboard, and the like, or any other convenient sanitizable, breachable material. The protective covering 2106 may be transparent, opaque or translucent.

FIG. 21 presents a convenient embodiment of a fruit portion comprising a non-soluble housing 2100 which is a non-soluble foam or mesh housing in the image of a fruit wedge, including but not limited to a lime wedge or slice. In this embodiment, to help the fruit portion take on the image of a natural lime, the non-soluble housing 2100 comprises an outer layer 2102, an intermediate layer 2103 and an inner region 2101, where each layer and region has similarities to the corresponding portions of a natural lime.

In the embodiment of FIG. 21, the inner region 2101 of the non-soluble housing 2100 comprises a retaining region 2104 for retaining the soluble flavoring entity 2105, including but not limited to one or more soluble flavoring tablets, beads, granules, and the like. Alternately, the flavoring entity 2105 may comprise flavored granules impregnated into the non-soluble housing 2100. The retaining region 2104 may comprise a sack, pouch, cavity, one or more pockets, and the like for inserting the soluble flavoring entity 2105.

The non-soluble housing 2100 is stored in a protective covering 2106, which in the embodiment of FIG. 21, is a tearable protective covering comprising foil and/or plastic. The protective covering 2106 may be adhered to, or otherwise associated with, the beverage vessel, including but not limited to a beverage bottle or can. In this embodiment, the protective covering 2106 comprises a perforation 2107 to facilitate breaching. Typically, the protective covering 2106 is torn open, and the non-soluble housing 2100 containing the soluble flavoring entity 2105 is removed from the protective covering 2106 and dropped into, pushed into, inserted into, or otherwise introduced into, a beverage vessel, including but not limited to a bottle or can. The non-soluble housing 2100 is typically larger in dimension than the opening in the beverage vessel from which the beverage liquid is consumed. If the non-soluble housing 2100 is elastic, it can be compressed during insertion into the beverage vessel. Once inside the beverage vessel, an elastic non-soluble housing 2100 will return to its uncompressed dimension, thus preventing it from leaving the beverage vessel during consumption of the beverage liquid.

As the consumer consumes the beverage liquid from the beverage vessel, the beverage liquid passes through the non-soluble housing 2100 and over the soluble flavoring entity 2105, thus dissolving a portion of the soluble flavoring entity 2105 and thereby mixing the intended flavoring with the beverage liquid during consumption. When the soluble flavoring entity 2105 comprises one or more flavored tablets, beads or granules, the size, surface area, shape, texture and number of the flavored tablets, beads or granules may be selected based on their dissolution rate, the amount of flavoring desired, and the like.

Figure 22:
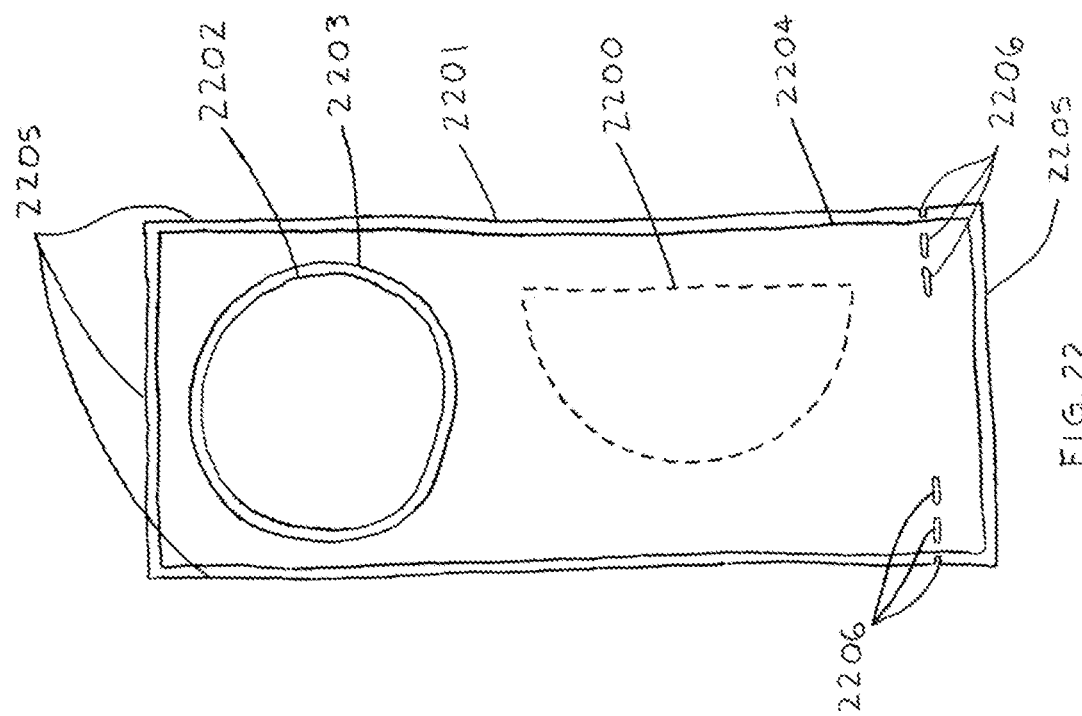
FIG. 22 is a flavoring stored in a tearable foil protective covering, where the tearable foil protective covering comprises a hole through a portion of it through which the neck of a beverage vessel can pass, so the tearable foil protective covering can be placed over and hung on the beverage vessel neck.

The useful embodiment of FIG. 22 comprises a soluble portion 2200 with flavoring, shown here in the shape of a fruit portion, stored in a tearable foil protective covering 2201. The soluble portion may comprise, but is not limited to a tablet, gelatin, powder, capsule, liquid, paste, pellet, crystal or thixotropic substance. The tearable foil protective covering 2201 has a hole 2202 through a portion of it through which the neck of a beverage vessel can pass, where the hole 2202 serves as an external fastener for attaching to a beverage vessel by placing the hole 2202 of the tearable foil protective covering 2201 over, and hanging it on, the beverage vessel neck. The perimeter 2203 of the hole 2202 is sealed such that the soluble portion 2200 is not exposed to air and moisture. The soluble portion 2200 is manufactured to comprise an elastic, porous and foam-like structure, similar to a marshmallow. The marshmallow-like structure additionally may be impregnated with a soluble flavoring. A useful alternative is where the flavoring source is a non-soluble, elastomeric, porous structure with a soluble flavoring added, where the soluble flavoring is added by such techniques including but not limited to being added by impregnation, coating, injecting and placing the soluble flavoring in an interior cavity. The soluble portion may comprise, including coated with, a substance to produce effervescence when it comes into contact with the beverage liquid. The soluble portion 2200 may expand when it comes into contact with the beverage liquid. Such expansion may be the result of a porous structure hydrating. The tearable foil protective covering 2201 is sealed 2204 around the edges 2205 and sealed around the perimeter 2203 of the hole 2202, typically using heat-activated adhesive and a heat press, and then the hole 2202, edges 2205 and one or more perforations 2206 for breaching are die cut. The edges 2205 of FIG. 22 are shown to meet with square corners.

Figure 23:
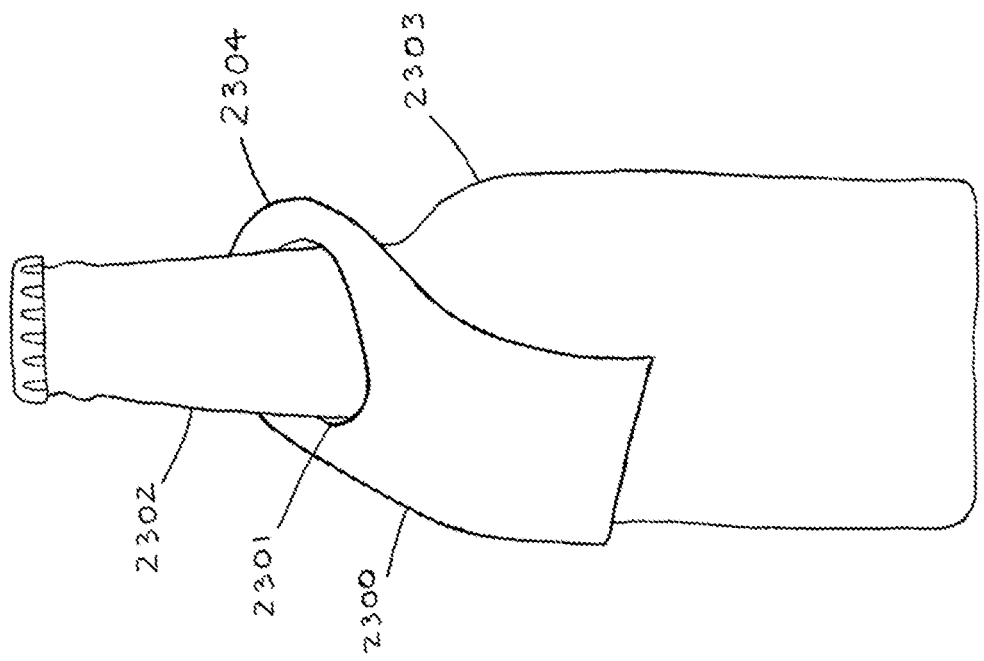
FIG. 23 is a flavoring stored in a tearable foil protective covering placed over and hung on a beverage vessel neck.

FIG. 23 illustrates a tearable foil protective covering 2300 with a hole 2301 placed over the neck 2302 of a beverage vessel 2303, where the tearable foil protective covering 2300 with the hole 2301 serves as an external fastener for attaching the tearable foil protective covering 2300 to the neck 2302 of the beverage vessel 2303. The tearable foil protective covering 2300 of FIG. 23 has a rounded edge 2304 around the hole 2301. The tearable foil protective covering 2300 encloses a flavoring source, typically a fruit flavoring, and typically a soluble fruit flavoring with a structure in the shape of a portion of a fruit. The flavoring source may also comprise a natural fruit portion. Except for FIGS. 19A, 19B, 20A and 20B, any of the earlier embodiments for a flavoring source may be used to substitute for the flavoring source in FIGS. 23 and 22.

Except for FIGS. 19A, 19B, 20A and 20B, it should be understood that for the most part, the various flavoring sources described throughout are fungible and can be used interchangeably in the various structures described throughout.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An apparatus used in conjunction with a beverage vessel containing a liquid with which a soluble substance is mixed, said beverage vessel having a narrow opening for drinking said liquid, said apparatus comprising:
a gelatinous elastic entity comprising said soluble substance for introduction and dissolution into said liquid, said elastic entity being larger than said narrow opening and for passing completely through said narrow opening and remaining unsecured inside said liquid past said narrow opening;
wherein said elastic entity has the shape of a wedge portion of a fruit, where three sides of said wedge portion include two substantially planar surfaces and a curved surface, and where only a portion of said two substantially planar surfaces are joined by said curved surface.

2. The apparatus according to claim 1, wherein said elastic entity is for floating in said liquid during consumption.

3. The apparatus according to claim 1 comprising a molded cavity for holding said soluble substance, wherein said elastic entity includes at least a portion of said molded cavity for controlling the rate of said mixing.

4. The apparatus according to claim 3, wherein said molded cavity comprises a licorice tube, edible film container, reverse spherification container, or wax container for holding said soluble substance.

5. The apparatus according to claim 1, wherein said elastic entity is molded and not for dissolving during liquid consumption.

6. The apparatus according to claim 1 comprising a dehydrated or freeze-dried soluble substance.

7. The apparatus according to claim 1, wherein said soluble substance expands or releases a gas.

8. The apparatus according to claim 1, wherein said elastic entity comprises a plurality of soluble substances.

9. The apparatus according to claim 1, wherein said soluble substance comprises a crystal, powder, tablet, bead, granule, pellet, capsule, liquid, paste, gelatin, or thixotropic substance.

10. The apparatus according to claim 1, wherein said soluble substance comprises citrus flavoring.

11. The apparatus according to claim 1, wherein said soluble substance comprises alcohol or salt.

12. The apparatus according to claim 1 comprising a flavoring, a body fuel, a nutritional supplement, a stimulant, a relaxant, or a medical drug.

13. The apparatus according to claim 1 comprising caffeine or a cannabinoid.

14. The apparatus according to claim 1, wherein said soluble substance is on the surface of said elastic entity.

15. The apparatus according to claim 1 comprising a marshmallow structure.

16. The apparatus according to claim 1 comprising said beverage vessel containing said liquid, wherein said narrow opening is between 0.39 inches to 1.0 inches across.

17. The apparatus according to claim 1, wherein said beverage vessel comprises a metal can.

18. The apparatus according to claim 1 comprising a fastener for attaching said elastic entity to a holder or carrier, wherein said holder or carrier is for holding or carrying said beverage vessel.

19. The apparatus according to claim 18 comprising a sealed protective covering for said elastic entity for being opened by tearing.

20. The apparatus according to claim 1 comprising a sealed protective covering for said elastic entity, wherein said sealed protective covering comprises a hole for passing a portion of said beverage vessel.

21. The apparatus according to claim 1, wherein said wedge portion comprises a portion of a spherical wedge or a cylindrical wedge.

22. The apparatus according to claim 1 comprising an outer layer and an inner region, wherein said outer layer is gelatinous and green in color, and said inner region comprises a marshmallow foam-like structure and a green color.

23. The apparatus according to claim 1, wherein said two substantially planar surfaces are not parallel.

24. The apparatus according to claim 1, wherein said elastic entity is green, yellow, or orange, and wherein said soluble substance is on the surface of said elastic entity and is for dissolving in said liquid and flavoring said liquid a citrus flavor.

25. The apparatus according to claim 24, wherein said soluble substance comprises lime, lemon, or orange citrus flavoring.

26. The apparatus according to claim 25, wherein said elastic entity comprises a color, texture, or structure corresponding to the natural fruit.

27. The apparatus according to claim 24, wherein said soluble substance does not comprise sugar.

28. The apparatus according to claim 24, wherein said elastic entity comprises a nutritional supplement.

29. The apparatus according to claim 1, wherein said soluble substance is in a molded cavity of said elastic entity.

30. The apparatus according to claim 1, wherein said elastic entity is not for fitting uncompressed through a 0.7-inch diameter circular narrow opening.

31. The apparatus according to claim 1, wherein said elastic entity is not for fitting uncompressed through a 0.87-inch diameter circular narrow opening.

32. An apparatus used in conjunction with a beverage vessel containing a liquid with which a soluble substance is mixed, said beverage vessel having a narrow opening for drinking said liquid, said apparatus comprising:
a gelatinous elastic entity comprising on its outer surface said soluble substance for introduction and dissolution into said liquid, said elastic entity being larger than said narrow opening and not for fitting uncompressed through a 0.7-inch diameter circular narrow opening, and for passing completely through said narrow opening when compressed, and for uncompressing and remaining unsecured inside said liquid past said narrow opening.

33. The apparatus according to claim 1, wherein said soluble substance expands or releases a gas for moving said elastic entity in said liquid.

34. The apparatus according to claim 33, wherein said elastic entity comprises the image of a portion of a flying vehicle, a water vehicle, a ground vehicle, a mechanical structure, or a creature.

35. A method for mixing a soluble substance with a liquid, said method employing a beverage vessel containing said liquid and having a narrow opening for drinking said liquid, a soluble substance for introduction and dissolution into said liquid, and a gelatinous elastic entity including said soluble substance and being larger than said narrow opening and for passing completely through said narrow opening and remaining unsecured inside said liquid past said narrow opening, wherein said elastic entity has the shape of a wedge portion of a fruit, where three sides of said wedge portion include two substantially planar surfaces and a curved surface, and where only a portion of said two substantially planar surfaces are joined by said curved surface, said method comprising the steps of:

compressing said elastic entity and passing said elastic entity completely through said narrow opening;

said elastic entity uncompressing and remaining unsecured inside said liquid past said narrow opening; and said soluble substance mixing with said liquid.

36. The method according to claim 35, wherein said elastic entity is green, yellow, or orange;

said method further comprising the steps of said soluble substance dissolving from the surface of said elastic entity into said liquid and flavoring said liquid a citrus flavor.

37. The method according to claim 36, wherein said elastic entity comprises caffeine or a cannabinoid, said method further comprising the step of consuming said caffeine or cannabinoid.

* * * * *